United States Patent [19]

Pritchard

[11] 4,214,823
[45] Jul. 29, 1980

[54] ANIMATION STAND CONTROL SYSTEM

[76] Inventor: Eric K. Pritchard, 1702 Plymouth Ct., Bowie, Md. 20716

[21] Appl. No.: 41,376

[22] Filed: May 22, 1979

[51] Int. Cl.³ ............................................. G03B 21/32
[52] U.S. Cl. ........................................ 352/87; 352/50; 352/54
[58] Field of Search ........................ 352/85, 87, 50, 54

[56] References Cited

U.S. PATENT DOCUMENTS

| | | | |
|---|---|---|---|
| 3,415,600 | 12/1968 | Yarbrough | 352/87 |
| 3,690,747 | 9/1972 | Vaughn | 352/87 |
| 3,817,609 | 6/1974 | Vaughn | 352/87 |
| 3,902,798 | 9/1975 | Trumbull et al. | 352/85 |

OTHER PUBLICATIONS

Computer Animation Techniques, JSMPTE, Mar. 1971, by Stephen A. Kallis, Jr., pp. 145-156.

Primary Examiner—Monroe H. Hayes
Attorney, Agent, or Firm—Leitner, Palan, Lyman, Martin & Bernstein

[57] ABSTRACT

A control system for an animation stand including a stored program computer for monitoring and storing a plurality of manually produced positions of a camera and a support relative to each other and for calculating a plurality of driver command signals from said stored positions and stored time frame or control data to produce a sequence of motions of said camera and said support relative to each other. A manually induced velocity vector is used by the computer to calculate driver command signals to effectuate the manually produced positions. Each axis of motion per time frame may be individually manually produced.

13 Claims, 25 Drawing Figures

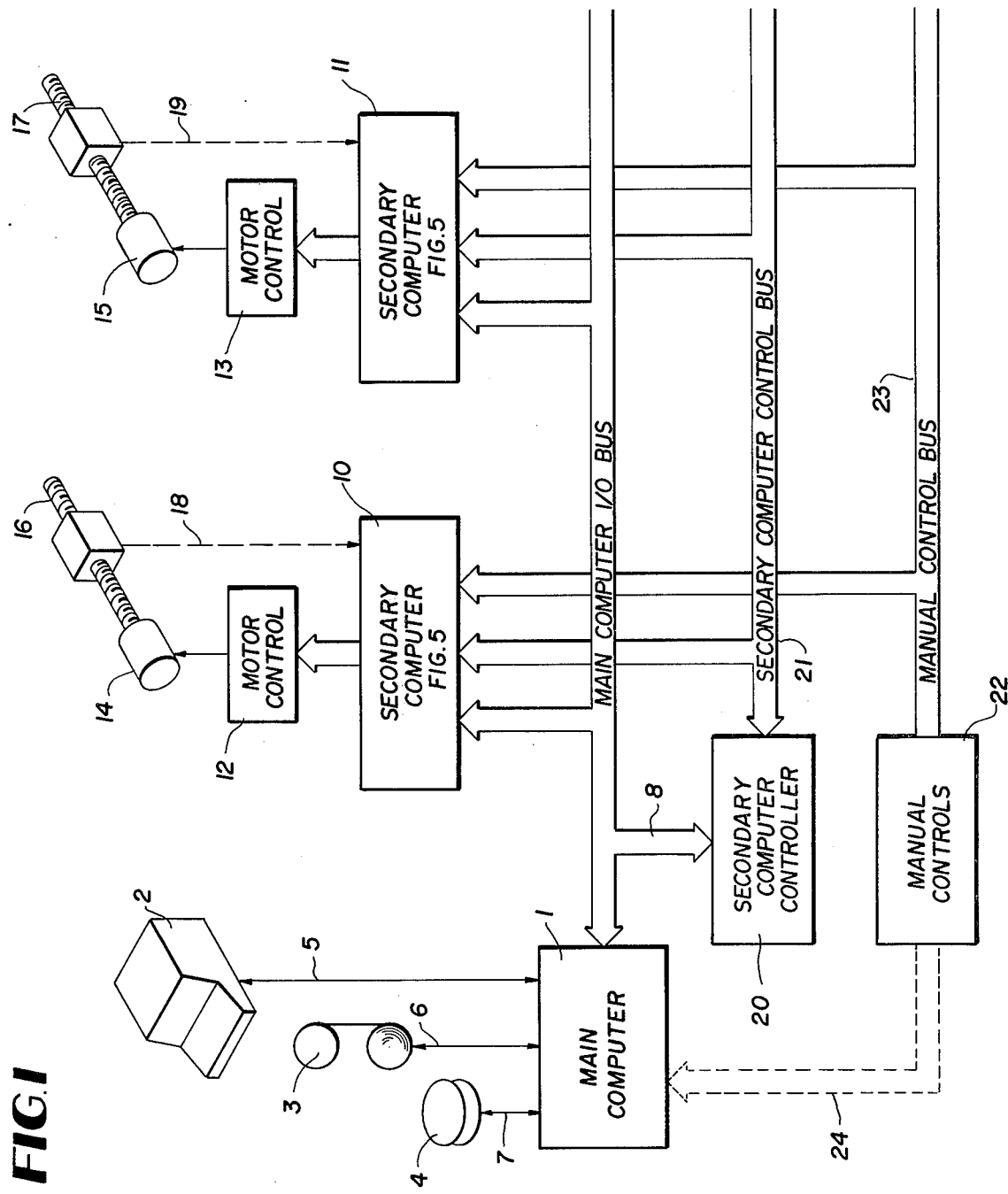

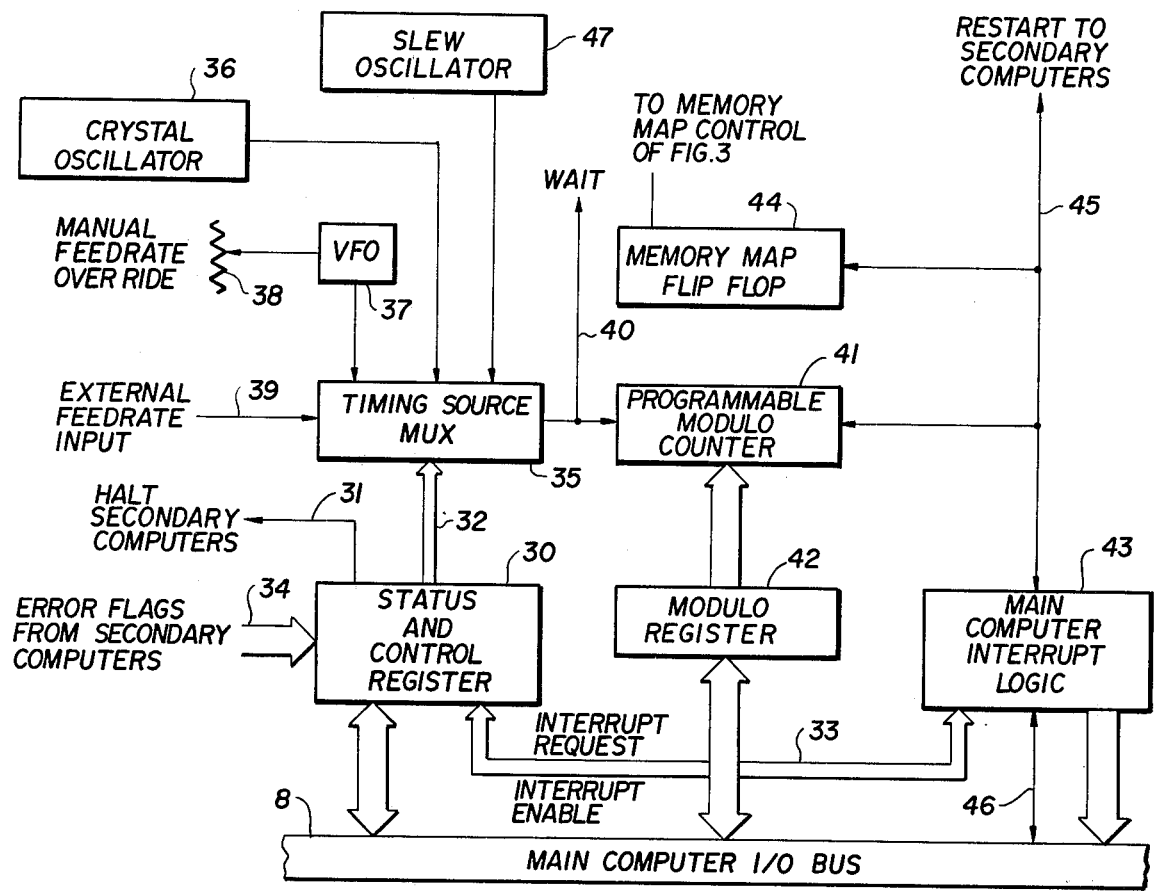
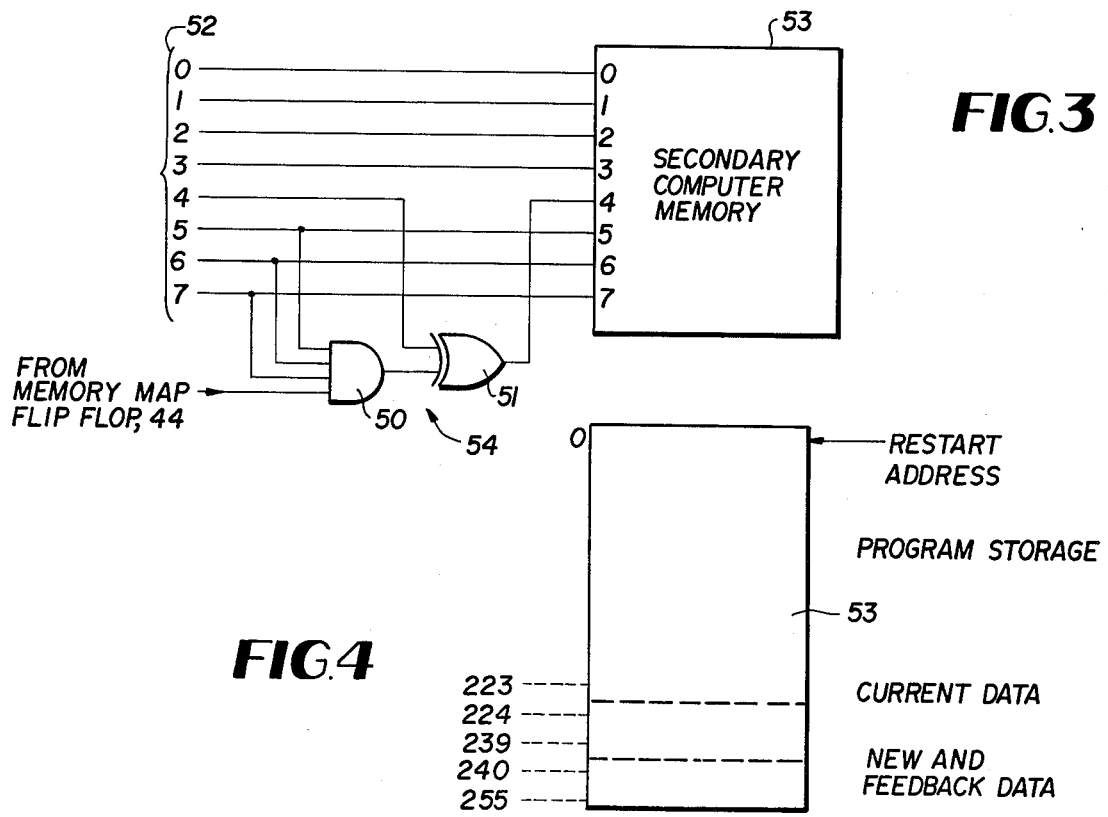

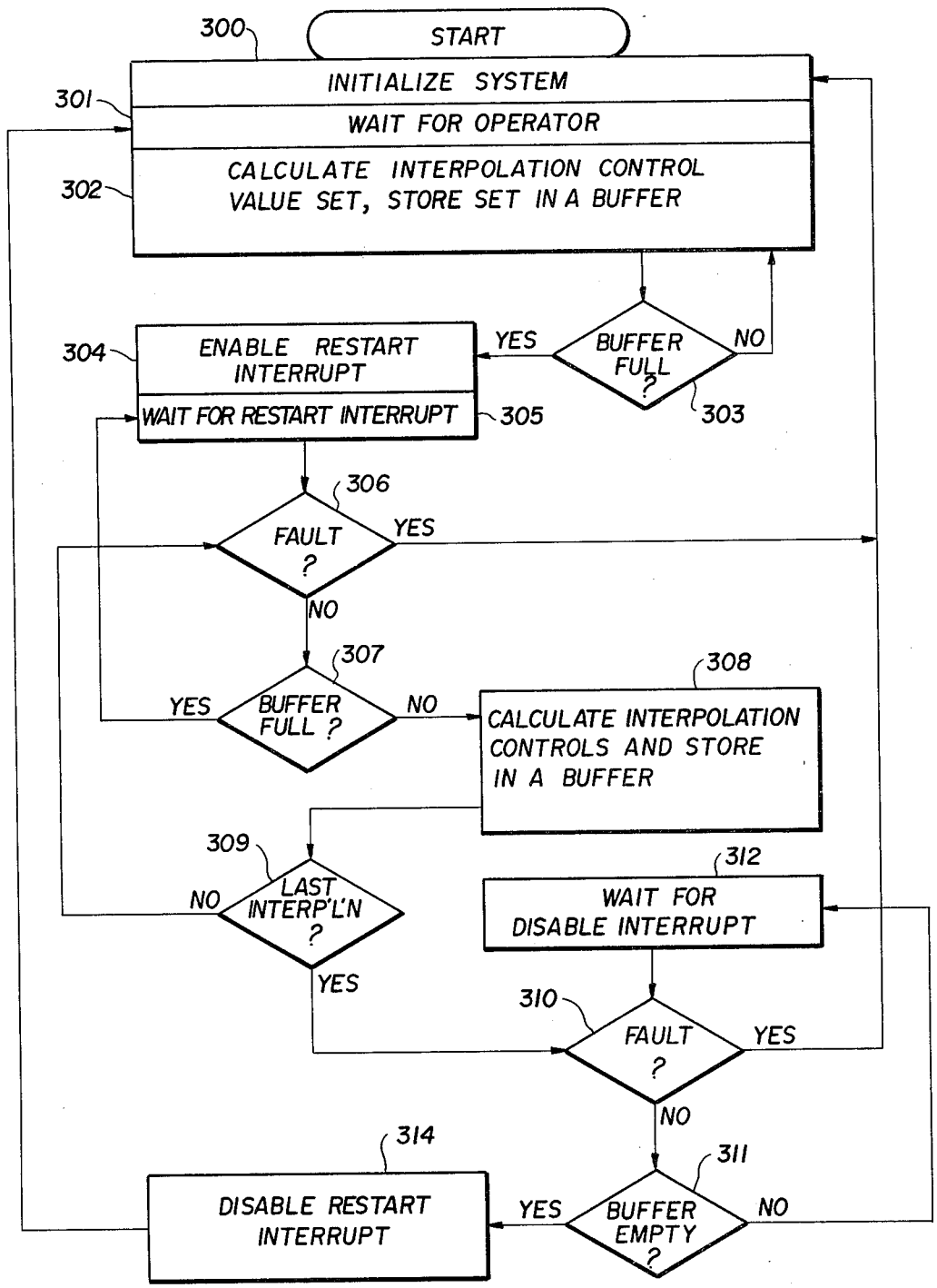
FIG.IIA

ANIMATION STAND CONTROL SYSTEM

BACKGROUND OF THE INVENTION

This invention relates generally to a numerical control system for moving members of a machine in a manner and synchronism determined by computer interpretation of input commands more specifically to a control system for an animation stand.

Contouring controls typically consist of one or more interpolators, a timing source, and a data processor. The interpolators move one or more machine members by controlling the motors which power those members. The interpolators use a timing source for determining machine motion vebcities. The data processor reads motion command data from a digital medium and outputs this data to the interpolators and timing source.

Inexpensive contouring controls interpolators use digital differential analyzers or rate multipliers. These electronic devices produce pulse trains which control stepping motors or position servos. The data processor reads the digital medium, typically a paper tape, and, with a minimum of processing, passes the control data to the interpolator(s) and the timer. Expensive contouring controls use computers to process the input data, often combining that data with manually entered information such as cutter size. The computer then controls the interpolator(s). Since the computer can provide data at much higher rates than a paper tape reader, the computer controlled interpolator is generally linear. A linear interpolator can approximate a wide variety of curves, but it must be closely supervised by the computer. This close supervision requires a large amount of computer processing thereby leaving little for data analysis.

An object of this invention is to provide an interpolator which requires little computer attention, thereby freeing the computer for more complex contouring data analysis.

Another object is to provide an interpolator which allows the use of less expensive computers without sacrificing speed or accuracy.

Stepping motors are often used in control systems for their open-loop simplicity and low-cost. Stepping motors in contouring systems are powered by electronic drivers. These drivers are responsive to pulse trains such as those produced by digital differential analyzers or rate multipliers. Examples of this art are Cutler (3,864,613), Leenhouts (3,525,917), Motooka (3,416,056), Herchenroeder (3,148,316), and Okamoto (3,634,667).

Stepping motors have an undesirable characteristic, they exhibit an underdamped response. This response can produce rough motion and at some frequencies even uncontrolled motion. This bad characteristic is further aggregated by the inconsistant pulse rate produced by rate multipliers. This undesirable characteristic can be reduced to virtual elimination by electronically dividing the motor's natural step into many small steps. These small steps also increase the resolution of the stepping motor significantly. Examples of this art are my U.S. Pat. Nos. 4,087,732 and 4,100,471.

A problem in controlling high resolution stepping motors with digital differential analyzers or rate multipliers is the high pulse rates which the timing source or feed rate generator must produce. The pulse rates are greatest when a short move must be executed at a high rate or in a very small time. This condition is created by the rate multiplier which requires a fixed number of timing pulses per machine movement.

An object of this invention is to incorporate the fractional step stepping motor drivers in a contouring control. A further object is an interpolator which can operate at acceptable data rates.

A particular application of this invention is to operate an animation stand. An animation stand is photographic equipment for filming two-dimensional artwork such as cartoons, titles, paintings, or photographs. A typical use of the animation stand is filming a documentary of an artists paintings. A full frame film of a commentator pointing to areas of interest does not have the impact of close-up films of those areas. The typical animation stand film shows the picture full frame; then zooms, pans, and tilts to and through the areas of interest; and finally zooms out to the full frame view. These film motions are generally linear since linear motions are simplest to compute. However, linear motions appear jerky at the corners of the linear motions. Continuous graceful motions are much more artistic.

Examples of animation stand control systems of the prior art are U.S. Pat. Nos. 3,415,600 to Yarbrough and 3,690,747 and 3,817,609 to Vaughn. Yarbrough disclosed an animation stand control similar to controllers for stepping motor operation of machine tools wherein the incremental motion commands in stepping motor steps are read from a paper tape. This, of course, requires the laborous preparation of the paper tape. Vaughn recognized this data processing chore and replaced Yarbrough's paper tape input with a computer which not only received the command data from an operator but also allowed the operator to communicate to the system in an absolute coordinate system instead of an incremental one.

This approach is not the thrust of the animation stand application of the present system, although it is valid for a machine tool. The object of the present system is to provide a system which uses itself to measure and record the positions of important points on the art work. The operator must point out these points by manipulating the manual controls and must enter the time for frame number associated with that point. However, unlike the prior art, the operator need not enter position data in any form, incremental or absolute, for example.

Further unlike the prior art, the present system is a system for controlling an animation stand by manual controls wherein the computer samples and stores the animation stand operation for later alteration and playback. Neither Yarbrough nor Vaughn suggest such a system.

An object of this invention is an animation stand control system which minimizes the mathematical or measuring tasks required of the operator and which maximizes the use of the data and computing capability built into the system.

Unlike other numerical control applications, the programs for an animation stand are used very few times. The move can easily be more complex than those found in numerical control machines. Furthermore, the personnel operating a numerically controlled animation stand are not so mathematically oriented as their machine tool counterparts.

Another object of this invention is to provide an interpolator which can accept manual control along arbitrary paths, a computer with a memory for recording the manual motions, and a combination of the interpolator and computer which can reproduce these moves. A further object of this invention is to create motion control from combinations of manual control data and previous manual control or numeric control data.

An even further object of this invention is to provide an interpolator which interpolates along curves defined by high order polynomials or complex functions.

A still even further object is to provide a high order polynomial interpolator which can be implemented completely by hardware, by a general purpose computer or by a specifically designed microprocessor.

A numerical control system presented by McGee, U.S. Pat. No. 3,656,124 uses a computer to control a linear interpolator. This interpolator divides its interpolation interval into a fixed number of iterations. When the main computer realizes that the end of a contour command will fall in the middle of an interpolation interval, the main computer either increases or decreases the machine motion rates so that the end of a contour command coincides with the end of an interpolation interval.

An even further object of this invention is to provide a means for changing the number of iterations per interpolation to avoid unnecessarily changing machine motion rates.

Numerical controllers or numerically controlled drivers to be effective must carry out two classes of operations at two different speeds. Interpolation and control of the servo system must be carried out at a high rate of speed in the order of microseconds whereas the handling of command data and preparing the same for processing in the interpolators may be carried out at a relatively low rate in the order of milliseconds. It has recently been economically feasible to use a small sized digital computer, for example, a mini-computer or microcomputer as a numerical control device. Since computers sequentially deal with various data according to a program and the rates of these computers are generally slow in contrast to the numerical control system, the system is only capable of course interpolation or the use of additional hardware circuitry such as linear interpolators to carry out the interpolation and control of servo functions. One solution to this problem presented by the prior art is to use two computers having different instruction execution time. In U.S. Pat. No. 4,118,771 to Pomella, et al., a first micro-processor having an execution time in the microseconds is used for general data handling whereas a second microprogrammed computer has an execution time in the range of 250 nanoseconds. The second computer is capable of handling complex calculations in real time, at a high rate in order to exploit the characteristics of the servo mechanism. The second computer could be considered a sophisticated arithmatical logic unit since the results are handled and communicated to the servo mechanism by the first computer. Thus, the speed of the second computer is compromised since it can only communicate with the servo mechanism through the first computer and consequently, the first computer uses valuable time in management of the second computer and the overall system.

Another approach using a single computer is described in U.S. Pat. No. 4,118,776 to Isomura. In this patent, two programs operate at two rates of speed, one in the millisecond range, and second in the microsecond range. The programs are interreliefed as are the computers of the Pomella, et al., patent consequently have the same deficiencies.

Thus it is an object of the present invention to provide two computers capable of independent operation to make maximum advantage of their maximum speeds.

SUMMARY OF THE INVENTION

An animation stand control system is provided which monitors manually produced positions and produces a plurality of command signals to reproduce the positions in a sequence. The control system includes an input device to convert manual manipulations into an input command velocity vector. A programmed computer calculates a plurality of driver command signals for motor drivers to position a camera and support means of the animation stand relative to each other and stores the final position. Each axis of motion is positioned separately. Control data is provided to the computer to indicator the time frame of the position for a set of axis. Upon initiation by the operator, the computer calculates driver command signal using a plurality of the stored positions and corresponding time frame data to produce a sequence of movement of the camera and support relative to each other.

The programmed computer may include Main Computer, relatively slow in operation, to perform master control and data handling as well as calculating interpolation points from the stored position and time from data. A high speed Secondary Computer, relatively simple in structure, is controlled by the Main Computer and receives sets of interpolation point data therefrom and by independent calculation and iteration extrapolate the interpolation point data to produce a sequence of motor driver command signals based on each set of interpolation point data received from the Main Computer. A manually induced velocity vector may be applied and stored in the Secondary Computer and subsequently may be provided to the Main Computer. The Main Computer may then calculate the appropriate sets of interpolation point data so as to repeat the manually induced motion. Alternatively, the velocity vector may be applied and stored in the Main computer which calculates sets of interpolation point data and forwards the same to the Secondary Computer for calculation of driver command signals.

The Main Computer, using quadratic, cubic or higher order polynomial, provides the interpolation point data as a set of velocity, acceleration, position, and optionally higher order derivative valves. The Secondary Computer provides velocity and position driver command signals by incrementing the acceleration with jerk, incrementing velocity with acceleration, and incrementing position with velocity.

The stepping motor drive of U.S. Pat. Nos. 4,087,732 and 4,100,471 are modified in this disclosure to optimumly receive the motor driver command signals. In this context the motor drive commands correspond to the desired electrical position of the stepping motor.

A Secondary Computer Controller synchronizes the operation and timing of one or more Secondary Computers relative to the Main Computer, each other and the camera. The number of iterations or the length of the sequence is determined by the Secondary Computer Controller using a preselected value determined by the Main Computer. The Secondary Computer Controller includes a plurality of timing signal sources and the rate of iteration of the sequence is a function of the timing signal source selected in the Secondary Computer Controller by the Main Computer. The Secondary Computer Controller also acts as an interface between the error logic of the Secondary Computer and the interrupt logic of the Main Computer. Upon the detection of an error, for example, an axis limit, the Secondary Computer Controller can include the capability to bring the Secondary Computer and the motor drives to a controlled stop using a phase locked loop to reduce the iteration rate to zero.

BRIEF DESCRIPTION OF THE DRAWINGS

FIG. 1 is a block diagram of the system components incorporating the principles of the present invention.

FIG. 2 is a block diagram of a Secondary Computer Controller incorporating the principles of the present invention.

FIG. 3 is a block diagram of a Secondary Computer memory map control incorporating the principles of the present invention.

FIG. 4 is a memory map of the Secondary Computer memory of FIG. 3.

FIGS. 11A and 11B are flow diagrams of the operation of the Main Computer for numerical control mode of Secondary Computers.

DESCRIPTION OF THE PREFERRED EMBODIMENTS

Figure 5:
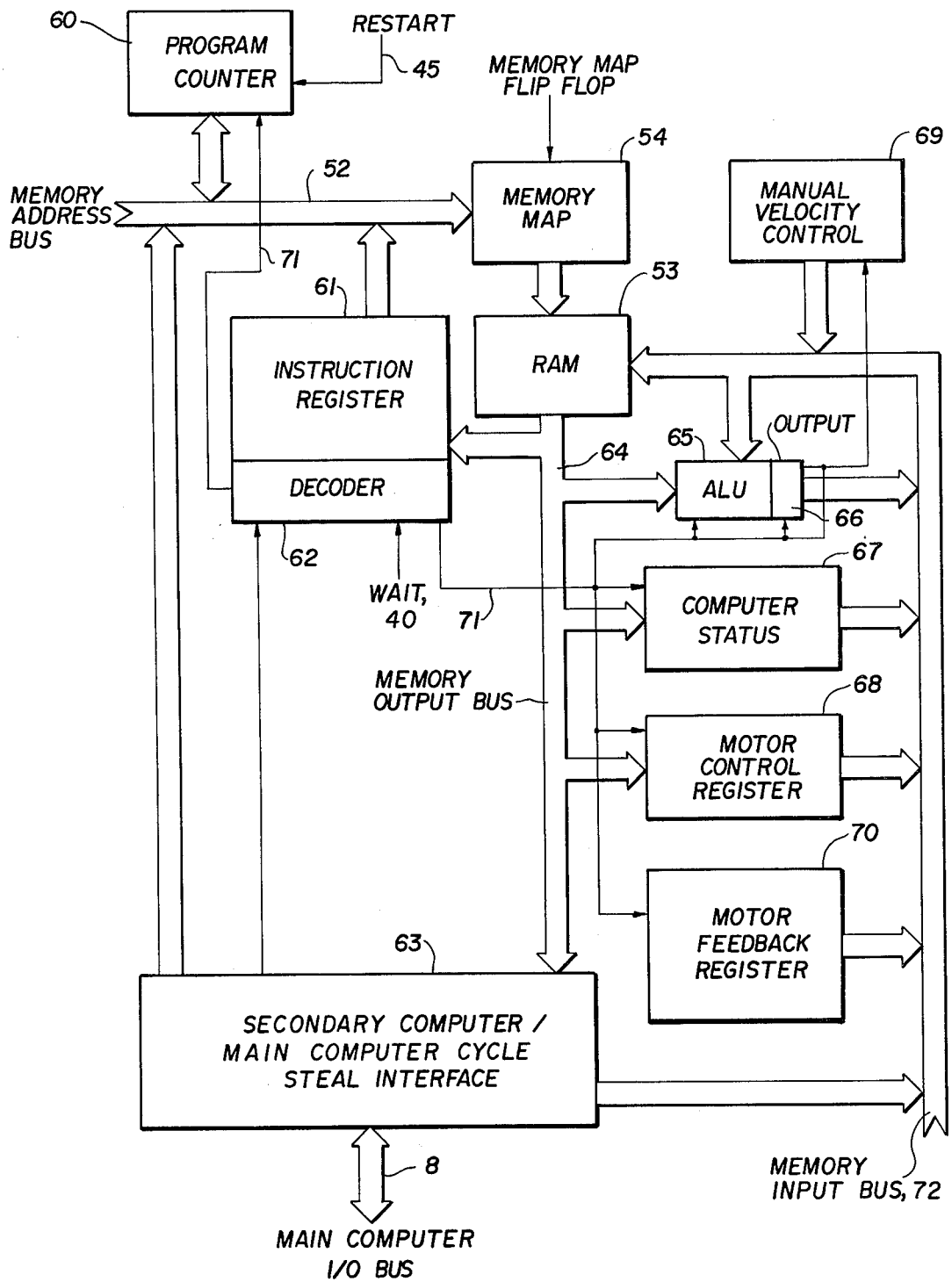
FIG. 5 is a block diagram of the major elements of a programmable Secondary Computer incorporating the principles of the present invention.

FIG. 1 is the overview of the hardware for a multi-axis contouring control system for an animation stand. A Main Computer 1 controls and communicates with all other elements of the system mainly by an I/O bus 8. The data processing terminal or teletype 2 provides operator control or input via signal path 5 and tape deck 3 and disk drive 4 provides expanded memory for program and data storage and retrival via signal paths 6 and 7. Interpolation or Secondary Computer programs and data are provided to Secondary Computers 10 and 11 from Main Computer 1 via I/O bus 8. The Secondary Computers calculate and provide motor control or command signals to motor controls or drivers 12 and 13 respectively. These motor controls energize motors 14 and 15 which in turn operate mechanisms depicted as lead screws 16 and 17. Sensors, which may be limit switches or other position measuring devices, may be used and connected by data paths 18 and 19 to Secondary Computers 10 and 11. A Secondary Computer Controller 20 communicates with Main Computer 1 via I/O bus 8 and provides synchronizing and common timing to the Secondary Computers 10 and 11 via secondary control bus 21. Manual controls 22 are connected to the Secondary Computer 10 and 11 by manual control bus 23 and may be connected to the Main Computer 1 via bus 24.

The Main Computer operates to calculate interpolation data by dividing the contouring scheme or path stored as command data into a plurality of points between which extrapolation is performed by the Secondary Computers. A set of interpolation point data from the Main Computer is stored in the Secondary Computers which calculate a sequence of motor driver command signals for that set of data. The Main Computer selects one of a plurality of timing signal sources in the Secondary Computer Controller 20 which determines the rate of iteration of the Secondary computers. The length of the sequence or the number of iterations performed by the Secondary Computers is controlled by the Secondary Computer Controller 20 as predetermined by the Main Computer. Upon reaching the end of a sequence of iterations as determined by the Main Computer, the Secondary Computer Controller restarts the Secondary Computers and provides an interrupt request to the Main Computer. The Main Computer then provides new or additional sets of interpolation point data for the next interpolation point. Other errors and faults in the Secondary Computer, for example, a direction limit or a program limit may also be provided to the Main Computer through the Secondary Computer Controller as an interface. The Main Computer also provides control data to the Secondary Computers to select stored programs or routines so as to perform the appropriate calculation and provide the appropriate motor driver command signals to respective motor controllers. Manual control input as a velocity vector may be provided directly to Secondary Computer via manual control bus 23 or alternatively to the Main Computer via bus 24. The Secondary Computer calculates the appropriate motor driver command signals based on the manual control input. These calculations may be stored and transmitted back to the Main Computer where appropriate interpolation and control data may be calculated and provided later to repeat the manually induced motion. Alternatively, Main Computer could calculate set of interpolation point data initially and provide them to the Secondary Computer for calculation of motor driver command signals.

The details of the system are illustrated in FIG. 1 and their operation will now be described in detail.

SECONDARY COMPUTER CONTROLLER 20

Secondary Computers 10 and 11 need a common timing and synchronizing means. The Secondary Computer Controller 20 as portion of the Main Computer/Secondary Computer interface provides RESTART, WAIT AND HALT signals to the Secondary Computers 10 and 11. The RESTART signal resets the Secondary Computer's program counter to a location common to all iteration programs. The RESTART signal is derived from a counter/timer within Secondary Computer Controller 20 and indicates the end of one interpolation interval or sequence and the beginning of the next. Within each interpolation interval there are iterations which are timed by a WAIT control signal which is derived from one of a variety of oscillators or timing sources. The HALT signal is received from Main Computer 1 and relayed to the Secondary Computers. The Secondary Computer Control 20 communicates with the Secondary computers 10 and 11 via bus 21. The Secondary Computer Controller may also be used to receive fault information from the Secondary Computers as error flags and communicate the same to the Main Computer. The fact that a unit has reached a motion limit may be an error flag. Thus, the Main Computer need only look in one place for a fault and, if one should occur, then spend the time of locating the fault instead of attempting to locate a possible fault at each Secondary Computer on each interpolation interval.

The Secondary Computer Controller 20, as illustrated detailed in FIG. 2, communicates with the Main Computer via the I/O bus 8. Bus 8 contains data, address, interrupt and bus control signals and communicates with various register when the register's address is present on the bus address lines in a mode of communication determined by the bus control lines. The details of this design are available in interfacing manuals available from Digital Equipment Corporation as well as other companies.

A status and control register 30 provides several control functions and it passes ERROR FLAGS back from the Secondary Computers 10 and 11. One bit available on signal path 31 halts the Secondary Computers, two more bits on signal path 32 control the selection of feedrate source and two bits on signal path 33 enables the interrupt logic and signals an INTERRUPT REQUEST. The remaining bits may be allocated to ERROR FLAGS from the Secondary Computers on signal path 34.

A timing source multiplexor 35 provides a feed rate from one of its plural selected inputs by the two bits on signal path 32. The feed rate inputs include a crystal oscillator 36, for precise timing, necessary, for example, during real time animation stand operations wherein movements must be timed to fractions of seconds. A variable frequency oscillator 37 is provided for numerical control applications having manual override 38 for the programmed cutter feed rates. External feedrate input 39 provides the capability of the control system being operated in synchronism with another device such as a lathe spindle for cutting threads or as a camera for maintaining frame-to-frame registration by using its feed rate source. A slew oscillator 47 is also provided for rapid motions. The selected feedrate or timing source signals are provided to the Secondary Computers 10, 11 via signal path 40 as a WAIT signal. When the WAIT signal goes to the zero state the Secondary Computers begins the next iteration or calculation in a sequence. Thus, the signal source determines the iteration and motor control feedrate.

A programmable modulo counter 41 is also connected to the output of the timing source multiplexor 35 and reduces a preset value by one for each WAIT signal. When the programmable modulo counter 41 reaches zero, it (a) resets itself with a predetermined value from the modulo register 42, (b) initiates an INTERRUPT in the Main Computer 1 via logic 43, (c) toggles memory map flip-flop 44, and (d) restarts the Secondary Computers 10 and 11 with a RESTART signal via signal path 45.

The use of the programmable modulo counter 41 is an important feature of this invention because it allows the interpolation interval to be lengthened or shortened to make the end of an iteration sequence or extrapolation interval coincide with the end of a geometrical path segment. The modulo register 42 determines the number of iterations per interpolation sequence which is set and verified by the Main Computer 1 via the I/O bus 8.

Memory map flip flop 44, alters the memory addressing within the Secondary Computers 10 and 11 and with the aid of the circuit in FIG. 3 simplifies the addressing of the Secondary memory buffers. Certain areas of memory are hardware designated as data buffers, FIG. 4. If the Secondary Computer memory 53 is 256 words long, for example, words 0 through 223 are used, as normal, for programs and local data storage. Words 224 through 239 are used for current cycle interpolation point data from the Main Computer and for feedback data calculated or sensed by the Secondary Computer to be sent to the Main Computer. Words 240 through 255 constitute the previous interpolation point data and will become the next interpolation point data depending when the Main Computer writes that data there. Programming of the Main and the Secondary Computers would be simpler if the addresses for both the present set of interpolation point data and the next set of interpolation point data remained constant, and not flip back and forth as typically done with all computer programming. The circuit of FIG. 3 makes these addresses appear constant. The upper three address bits 5, 6, 7 on the secondary memory address bus 52, which indicates a data buffer address, i.e. 224 through 255, are combined with the signal from memory map flip flop 44 at AND gate 50 to control the valve of address bit 4 of address bus 32 via exclusive OR 51. If a data buffer address (224 plus) is addressed as determined by AND gate 50 and memory map flip flop signal from 44 is logic zero, the output of exclusive OR 51 is the signal on address bus bit 4. If a data buffer address is addressed and the memory map flip flop signal is a logical one, then AND gate 50 causes the exclusive OR gate 51 to invert bit 4 of the memory address bus 52. This action causes the memory to address word 240 instead of 224, 224 instead of 240 and so forth. Thus, the two buffer areas are reversed on each change of memory map flip flop 44, i.e. at every interpolation or sequence restart. The logic 50 and 51 and their control of the memory addressing will be denoted as a memory map 54.

The Secondary Computer RESTART signal on signal path 45 causes the Secondary Computers 10 and 11 to provide any feedback data to the Main Computer 1 and to start iterations on new sets of interpolation point data possibly in a new mode. The RESET signal also initiates an INTERRUPT REQUEST to interrupt logic 43. If the INTERRUPT ENABLE bit within the status and control register 30 has been set, the INTERRUPT REQUEST becomes an INTERRUPT on signal path 46 to I/O bus 8. Upon receipt of an INTERRUPT ACKNOWLEDGEMENT from the Main Computer 1, the interrupt logic 43 asserts an interrupt vector on the I/O bus address line. The Main Computer 1 then goes to the vector address for the entry point of the interrupt service routine. Although this is generally the interrupt procedure, the specific details will depend upon the computer used and are readily available from the computer manufacturer. The interrupt logic 43 is described and illustrated as being part of the Main Computer. Alternatively, the Secondary Computer Controller 20 maybe integrated into the Main Computer or have its own interrupt logic. The important feature being that the status and control register 30 provides a single centralized location and interface between the status and error logic of a plurality of Secondary Computers and the management or interrupt system of the Main Computer. By having an INTERRUPT REQUEST responsive to the RESTART signal, the Main Computer 1 can stop the Secondary Computers from restarting if the Main Computer should have failed to provide a new set of interpolation point data.

SECONDARY COMPUTER

The architecture of the Secondary Computers 10 and 11 are diagrammed in FIG. 5. The operations to be performed by the Secondary Computers do not demand sophisticated hardware. An applicable design for the Secondary Computer need only: (a) direct addressing, (b) no index registers, (c) simple, single-cycle instructions, i.e. load accumulator, add, subtract, store, and (d) either data words with many bits or better instructions which ease execution of multiple word precision operations. However, one stringent requirement is a program execution time of 25 or fewer microseconds. This requirement requires an instruction cycle time of about 500 nanoseconds. The elements illustrated in FIG. 5 are part of any general purpose programmable computer.

As in most computers, the Secondary Computer has a program counter 60. During an instruction fetch sub-cycle the contents of the program counter 60 is placed upon the memory address bus 52. During the execution sub-cycle of an instruction, the address portion of that instruction is placed upon the memory bus 52 by the instruction register 61. If the instruction is a jump instruction whose condition is true, then the program counter 60 copies the memory address bus 52 contents. If the Main Computer 1 seeks to read or write in the Secondary Computer's memory 53 then an instruction cycle is stolen; and the proper bits of the I/O bus 8 are placed on the memory address bus 52 by the Main/Secondary Computer cycle steal interface 63.

During all memory operations, instruction fetch and execution, the memory address bus 52 is altered by the memory map circuitry 54, herein before described and depicted in FIGS. 3 and 4. The altered memory address bus then addresses Secondary Computer memory 53 illustrated as a random access memory (RAM). The Secondary Computer memory 53 may also include stored programs in a ROM and iteration data stored in a RAM. The appropriate mode program stored in Secondary Computer memory 53 is selected by data from the Main Computer.

During the fetch sub-cycle a word is read from the random access memory 53 onto memory output bus 64 and stored temporarily in the instruction register 61. Part of this word is the memory address which addresses the random access memory 53 during the subsequent execution sub-cycle as previously described. The remaining portion of instruction word is decoded by decoder 62 to control the various portions of the Secondary Computer. The decoder 62 commands an arithmetic logic unit (ALU) 65 to perform various arithmetic and logical operations upon its inputs. It also controls the arithmetic logic unit output register 66, the computer status register 67, motor control register 68, manual velocity control register 69 and motor feedback register 70 directing which of the registers 66–70 may receive data from memory output bus 64 and which assert their contents upon the memory input bus 72. The decoder 62 also controls the program counter 60. Upon a true condition jump the program counter 60 accepts the new address from the memory address bus 52. Decoder 62 further keeps the program counter 60 from advancing during a wait instruction until the WAIT signal on signal path 40 becomes a logical zero, whereupon the Secondary Computer continues iterations.

The Main/Secondary Computer interface 63, is used by the Main Computer 1 to communicate with the Secondary Computer's random access memory 53. This interface maps a group of addresses on I/O bus 8 onto the entire address range of the memory 53. When the Main Computer 1 asserts one of these addresses, the interface 63 allows the current instruction to execute and then keeps the next instruction from preceding until after the Main Computer 1 has read from or written in the memory 53.

MOTOR DRIVERS

Figure 6:
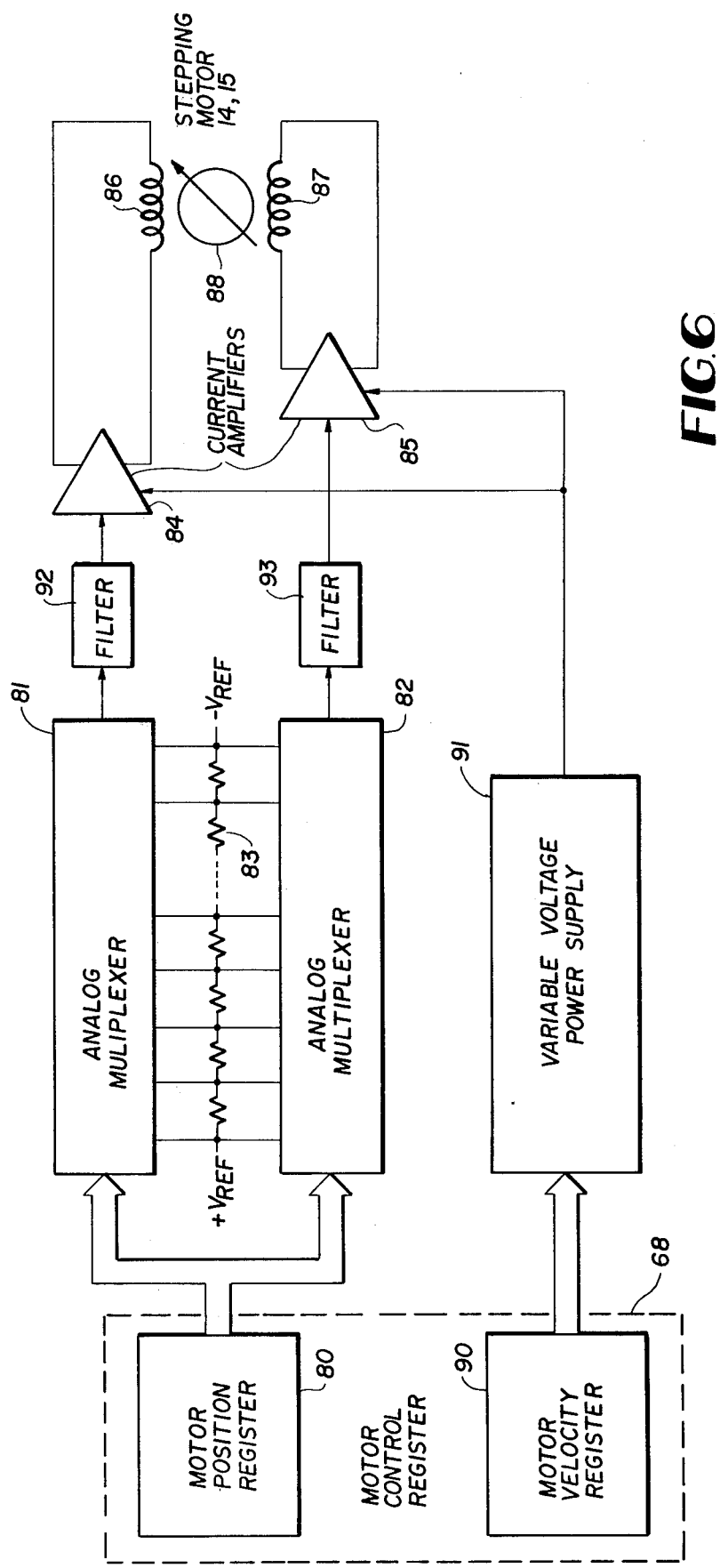
FIG. 6 is a block diagram of a stepping motor controller or driver.

The stepping motor controllers or drivers 12, 13 for this system are shown in FIG. 6. This driver is an adaption of drivers disclosed in my U.S. Pat. Nos. 4,087,732 and 4,100,471 which are incorporated herein by reference. These patents describe an electronic technique for sub-dividing the natural step of a stepping motor into many small steps. This subdivision produces better resolution and reduces resonance effects. The adaption of the earlier drives is to substitute a register 80 for the up/down counter. The use of a computer register provides more direct control over the motor driver and allows the desired position of the motor to change by more than one small step at a time. This is an important feature when slewing.

Motor control register 68 includes a motor position register 80 which provides address information to the multiplexers 81 and 82. The multiplexers select one of the voltages produced by a multi-tapped voltage divider 83 which is energized from reference voltages. The selected voltages are optionally filtered by filters 92 and 93 and then drive current amplifiers 84 and 85. Although these amplifiers may be linear, better power efficiency and low implementation costs are possible with switching technology.

This stepping motor driver can supply a variety of waveforms to the motor. If the stepping motor were ideal this driver would produce sinusoidal and cosinuoidal winding currents. However, stepping motor are not ideal. The motor currents must be compensated. The voltage divider and multiplexers produce compensated waveforms so that the motor makes approximately equal sized steps in motor shaft position.

The filters 92 and 93 may be required to avoid mid-frequency resonance in the stepping motors. The current amplifiers can sense via their internal feedback path the motor operation. If current in the motor winding does not rise as fast as if the motor is going slow because the motor's induced winding voltage reduces the effective supply voltage. The feedback is effective in controlling this behavior if the amplifier input is sloped or composed of many small steps. If the motor is slow, the current rises rapidly to a higher level than if the motor is going fast. The higher current makes the motor accelerate. Conversely, if the motor is fast, the current rises slowly to a lower level causing a deceleration. Thus, the feedback compensates for the motor's natural capability of resonating in the mid-frequency region. However, the interpolar when slewing will not use every step, it will skip steps thereby destroying the small step approximation to a sloped waveform. The filters 92 and 93 insure that the current amplifier inputs are sloped.

The position register 80 is set by the Secondary Computer to a portion of the calculated several bit position word. The most significant bit of this portion corresponds to one-half of the electrical cycle of the stepping motor. For four-phase motors this bit corresponds to two full steps. The next bits are one step, half step, quarter step, etc. This register must be updated rapidly to insure adequate construction of the stepping motor current waveforms.

The value within the position register 80 is the absolute position, although scaled and offset by fixed values, of the stepping motor driven member modulo the distance travelled while moving one electrical cycle. Thus, for four-phase motors this distance is that corresponding to four full steps. Consequently, the computer programming is simplest if this absolute coordinate system is maintained throughout the computational system. This is a distinct change from other stepping motor systems which deal in relative coordinates.

One implementation of a stepping motor driver incorporates a variable voltage supply such as 91 which is explained in detail in U.S. Pat. No. 3,967,179. This supply produces a voltage which is large for high stepping rates and low for low stepping rates. The stepping rate data is obtained from a step command line and like all frequency converters suffers some delay. This delay reduces the acceleration capability of the motor. Since the interpolation computer produces a velocity value, this value may be made available by motor velocity register 90 which is a part of motor control register 68. This technique eliminates any delay produced by frequency converters of the prior art.

Figure 7:
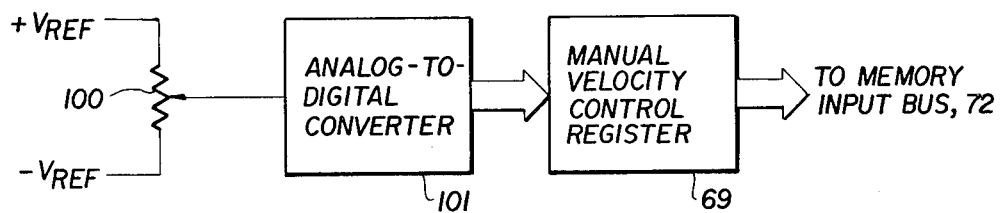
FIGS. 7 and 8 are block diagrams of circuits for manual control inputs to the Secondary Computer.

Numerical control systems and particularly animation stand control systems need a manual control means for positioning the controlled machines axes. A simple control is disclosed in FIG. 7 and a more complex control, in FIG. 8. The manual velocity control register 69, also found in FIG. 5, provides Secondary Computers 10 and 11 access to a manually induced velocity vector input. A potentiometer 100 divides a voltage between positive and negative references to provide an input to an analog-to-digital converter 101. Thus, a digital representation of the manual velocity vector input is available to the Secondary Computer.

Figure 8:
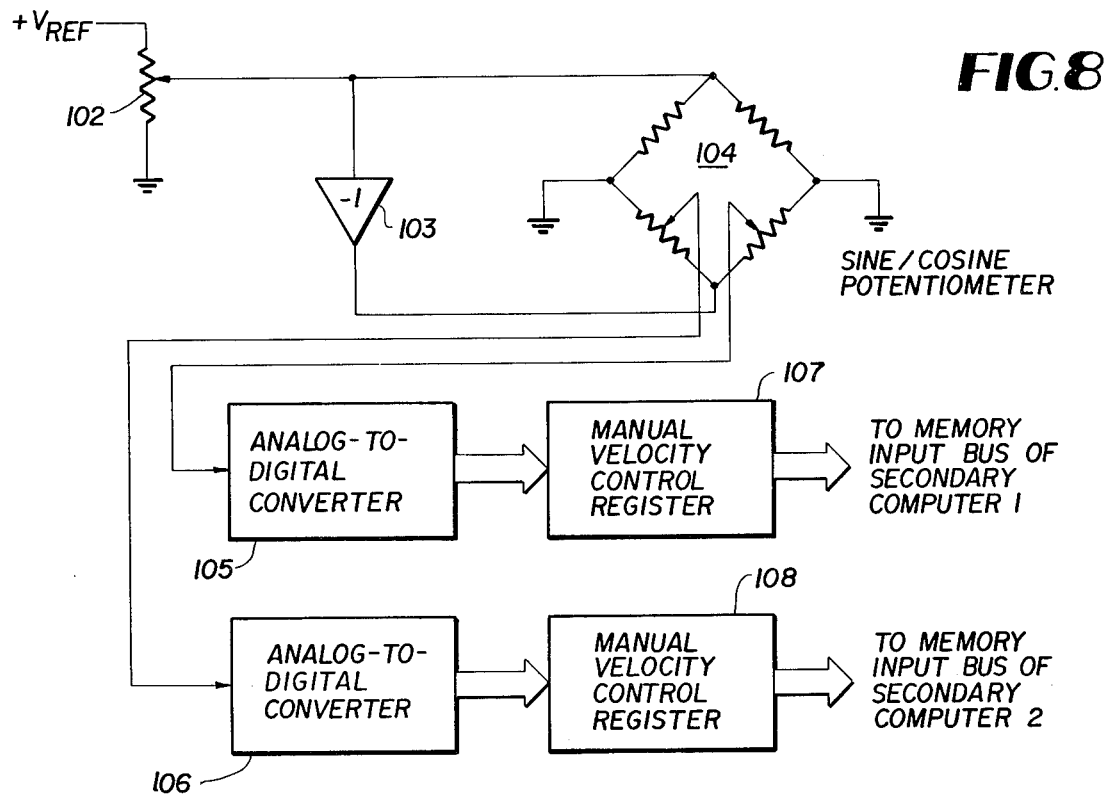

The more complex manual control, FIG. 8 is particularly applicable to the north-south/east-west axes of an animation stand. This X-Y table is advantageously moved along various angles at various rates. While there is a mathematical transformation from this method of control to controlling each axis individually, the transformation is not easy for an operator to perform in real time. The circuity of FIG. 8 performs this transformation. Potentiometer 102 selects a voltage between zero and a reference voltage. This voltage drives a sine-cosine potentiometer 104. This potentiometer resolves its input voltage into two voltages whose values are proportional to sine and cosine of the potentiometer's shaft angle. As in FIG. 7, these voltages drive analog-to-digital converters 105 and 106. The resulting digital values are stored in velocity registers 107 and 108. These registers are similar to register 69 and therefore provide Secondary Computer access to manual control data.

Figure 9:
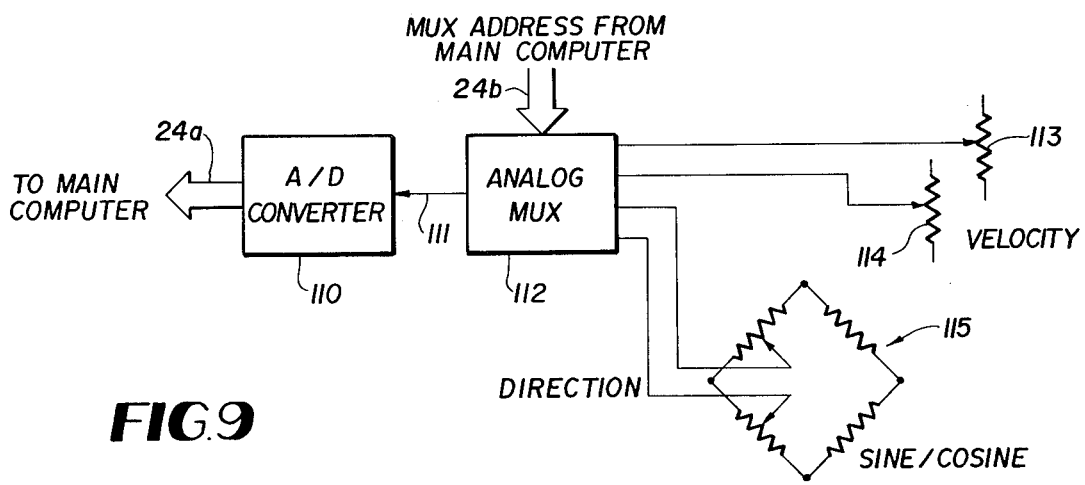
FIG. 9 is a block diagram of a circuit for manual control inputs to the Main Computer.

A less expensive alternative to a manual control subsystem for each motion axis is depicted in FIG. 9. The economy is produced in part by requiring a single analog-to-digital converter 110 for the entire system. The digital values produced by this converter are sent to the Main computer 1 via path 24a. Signal path 24b provides the address information to the analog multiplexer 112. This multiplexer selects the analog voltage from one of the potentiometers 113 through 115 for conversion by A/D converter 110. Further cost reduction is realized since this alternate method also does not need registers 69, 107 and 108. Although this alternate method does not have as great a frequency response, its response is sufficient for manual control.

OPERATION OF SECONDARY COMPUTER

The operation of the Secondary Computers 10 and 11 will be described for a fractional stepping motor driver. The operation described hereinafter is based upon a new approach to contour interpolation and is also applicable to driving a motor.

Prior art stepping motor contour controls provide two-axis circles through an integration process mathematically similar to Euler's numerical integration method. Prior art servo motor contour controls also use a technique similar to Euler's method. More sophisticated numerical integration methods exist, for example, Milne's, Runga-Kutta, corrector-predictor, etc. These methods require many fewer calculations to complete a numerical integration than Euler's. However, the prior art uses Euler's because the motor controls require frequent updating.

The purpose of the Secondary Computer is to provide the required frequent motor control updating and free the Main Computer to perform more sophisticated tasks, or to allow the Main Computer to be slow, as the present micro-processors are.

Similar two-stage motor controls are presented by McGee, U.S. Pat. No. 3,656,124 and Patterson and Haselby, "A Micro-stepped XY Controller with Adjustable Phase Current Waveforms" Proceedings Sixth Annual Symposium on Incremental Motion Control Systems and Devices. However, these systems incorporate a linear interpolation between points on an arc. While linear interpolations are simply implemented, they do not provide the accuracy of a high order function. Linear interpolators may be used for small angles of arc without incurring large errors. The linear interpolation error over an arc is:

$$(\theta^2 R/8)$$

Where $\theta$ is the radian angle traversed during an interpolation, and R is the radius of the arc. By comparison, a suitably fitted cubic will interpolate with an error of:

$$(\theta^4 R/384)$$

Thus, for interpolations covering less than one radian, approximately 57°, the cubic is always superior.

This improvement in interpolation accuracy permits longer interpolation distances and fewer interpolations. With fewer interpolations to process, the Main Computer can profitably use a sophisticated integration technique. While Euler's method produces an error of:

$$(\theta^2 R/2)$$

Runga-Kutta produces an error of:

$$(\theta^6 R/144)$$

Again, the more sophisticated methods are far superior for traversed angles of less than one radian. Thus, the more sophisticated techniques provide far greater accuracy or require far fewer interpolations for the same accuracy.

The solution to forming a cubic extrapolation function is in the summation calculus:

$$\sum_{i=1}^{n} 1 = n \tag{1}$$

$$\sum_{i=1}^{n} i = \tfrac{1}{2}n(n + 1) \tag{2}$$

$$\sum_{i=1}^{n} \tfrac{1}{2}i(i + 1) = \frac{1}{6} n(n + 1)(n + 2) \tag{3}$$

Thus, by repeated sums, a quadratic, a cubic or any polynomial can be formed. The repeated summation can also provide motion quantities important to motor control. At each summation a value of jerk increments acceleration which is then added to velocity which is summed with position. Thus, the acceleration at time n, is:

$$A_n = A_o + \sum_{i=1}^{n} J = A_o + nJ \tag{4}$$

where $A_o$ is the initial acceleration and $J$ is the constant jerk. Similarly, the velocity at time n is:

$$V_n = V_o + \sum_{i=1}^{n} A_i = V_o + nA_o + n(n + 1)J \tag{5}$$

where $V_o$ is an initial velocity. The position at time N is:

$$P_n = P_o + \sum_{i=1}^{n} V_i \tag{6}$$
$$= P_o + nV_o + \tfrac{1}{2}n(n + 1)A_o + \frac{1}{6} n(n + 1)(n + 2)J$$

where $P_o$ is an initial position. The position expressions can be expanded for m terms $T_{ok}$ as:

$$P_n = \sum_{k=0}^{m} \frac{(n + k - 1)!}{k!(n - 1)!} T_{ok} \tag{7}$$

where $P_o = T_{oo}$, $V_o = T_{o1}$, $A_o = T_{o2}$ and $J_o = T_{o3}$.

After each iteration of sums, the Secondary Computer can supply position, velocity, and/or acceleration commands to a motor controller or driver. Furthermore, the iteration rate can easily be sufficiently high to accurately produce motor driver command signal.

The operations for the Secondary Computer are flow charted in FIGS. 10A through 10G. At the beginning of each interpolation interval or sequence, the Seconary Computer's program counter 60 is reset to zero by the RESTART signal 45 from the Secondary Computer Controller 20. Thus, the Secondary Computer is forced to begin at the oval 200 marked interpolation start. The contents of the Secondary Computer are copied to the exchange memory area designated for interfacing with the Main Computer, 201, i.e. some location from 240 and 255 in the memory, FIG. 4. Additionally, any other data might be passed such as the contents of a position feedback, 70. This feature when applied to a stepping motor drive system will provide verification of the proper motion of the stepping motor. Although this feature is optional, it does provide the Main Computer a verification of commands. Very little extra software is needed to adapt the Secondary Computer from stepping motors to servo motors. The use of computers in servo motor feedback loops is already established by many inventors including Fiegehen, et al., U.S. Pat. No. 3,412,023.

The next step, 202, is to obtain this Secondary Computer's status word from the exchange memory, words 224 through 239, FIG. 4. This step completes those functions common to the beginning of all interpolation modes. Now a jump must be made to the applicable programming at block 203. Although there are many possible methods of doing this, the technique used here is to have the Main Computer store a Secondary Computer jump instruction to the applicable software. A jump instruction to this jump instruction then transfers control to contour mode at block 204, manual mode at block 205, slew mode at block 206, halt mode at block 207 or position mode at block 208.

Figure 10A:
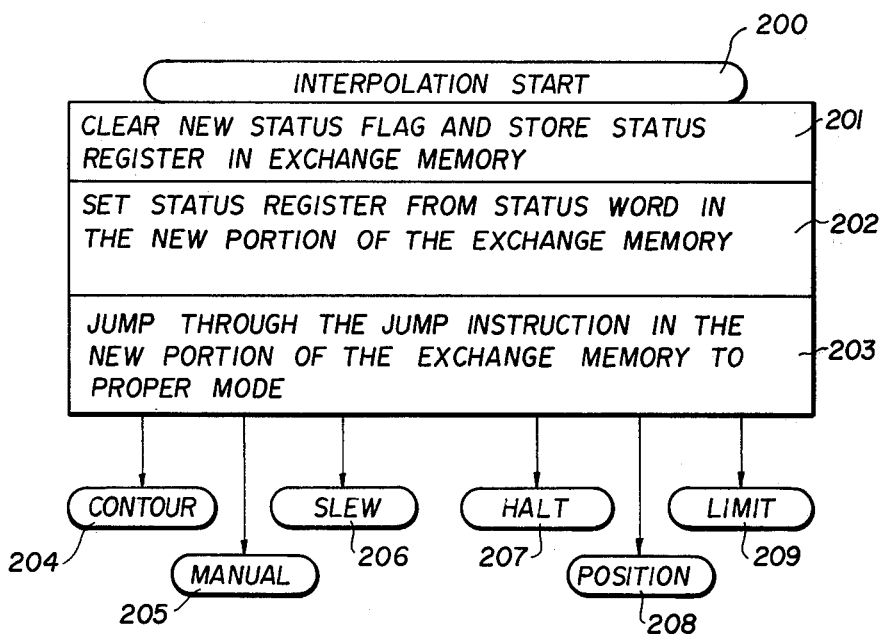
FIGS. 10A through 10G are flow diagrams of the operation of a Secondary Computer incorporating the principles of the present invention.
Figure 10B:
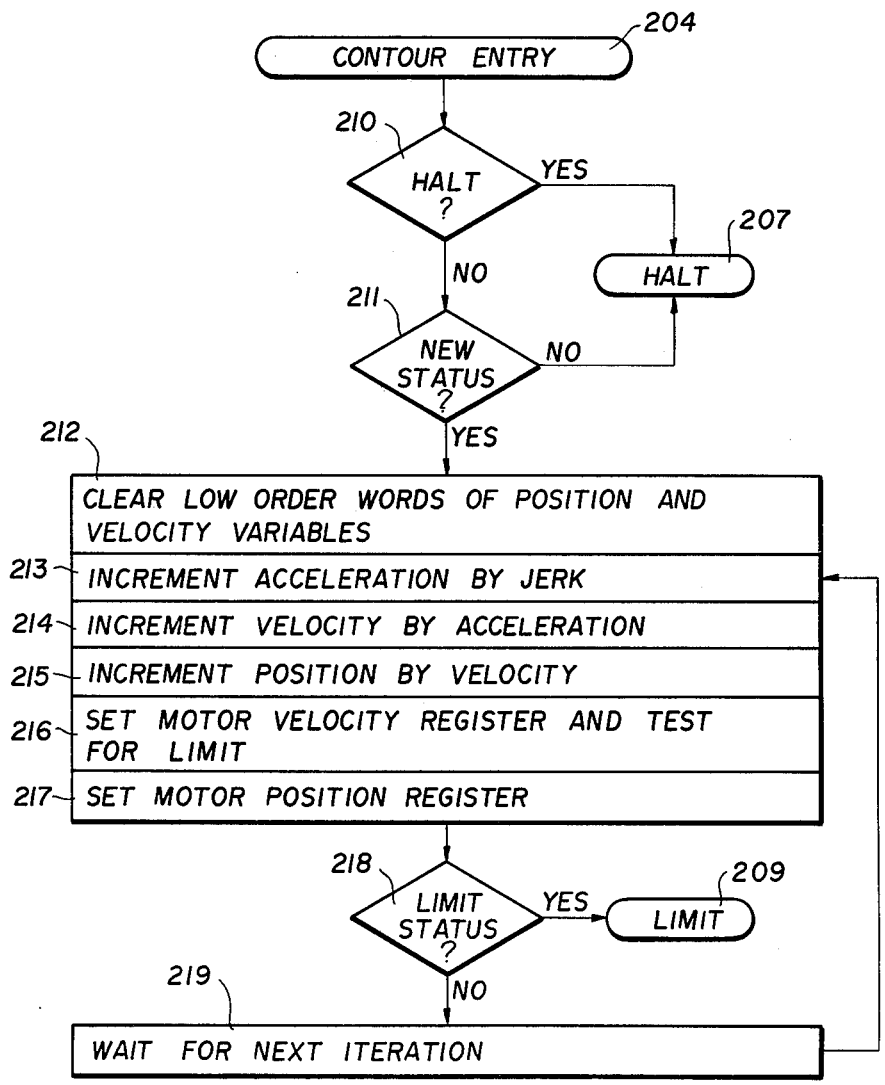
Figure 10D:
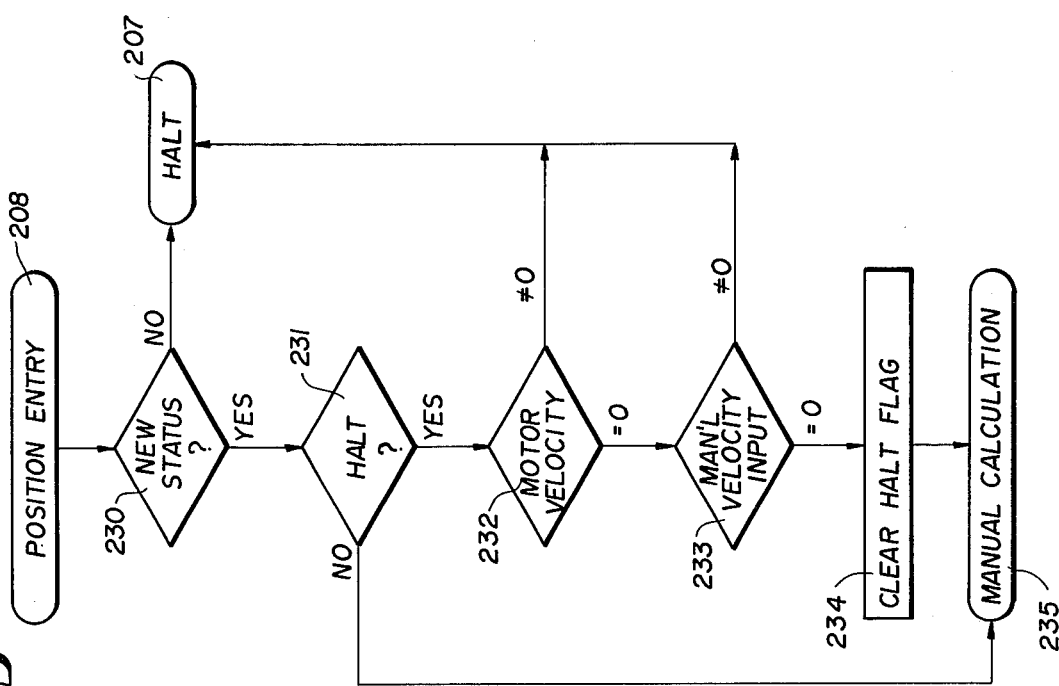

The contour routine or mode, FIG. 10B, begins with a check of the status, at block 210, which may find that the some fault such as an axis reaching a travel limit has demanded that this axis be halted. Similarly, the present status and consequently the interpolation data may be old, block 211, thereby demanding that the axis be halted. The request of a halt status and an old status will cause entry into the halt mode at block 207.

Next, at block 212, the low order words of the multi-word precision position and velocity variables are cleared. This is part of a procedure to avoid truncation errors. One possible technique is to have the axis position communicated between the Main and Secondary Computers quite infrequently. This, however, allows insignificant truncation errors to accumulate to significance. Consequently, the initial position and velocity for which the Main Computer calculated values acceleration and jerk, will be supplied at the beginning of each interpolation interval.

Now the iteration loop is entered, at block 213. Here the jerk value is used to increment the accleration value. Then, in block 214, acceleration increments velocity, and in block 215 velocity increments position. This implements the summations detailed in equations 4 through 6.

The motor velocity and position registers 80 and 90 are updated in blocks 216 and 217 so that the motor driver is made aware of the latest conditions of position and velocity it should seek. At this time, the test for a limit condition is made at 218. Here the Secondary Computer examines limit switches on axis 16, 17 via signal path 18,19. A limit condition is set in the status register 67 if the axis limit is reached and the axis is traveling in that direction. The status register 67 is tested in 218. If a limit condition has occured then it is handled by the limit mode 209.

This completes one iteration of the extrapolation sequence. Now the Secondary Computer must wait until the appropriate time for the next interval at block 219. This is done by a WAIT instruction which keep the program counter 60 from incrementing so long as the WAIT signal on signal path 40 is a logical one. When this signal becomes zero, the Secondary Computer will re-execute blocks 213 through 218 and then wait again. This process continues until another RESTART signal on signal path 45 causes the Secondary Computer to begin at the beginning 200 or a limit condition is reached.

Figure 10C:
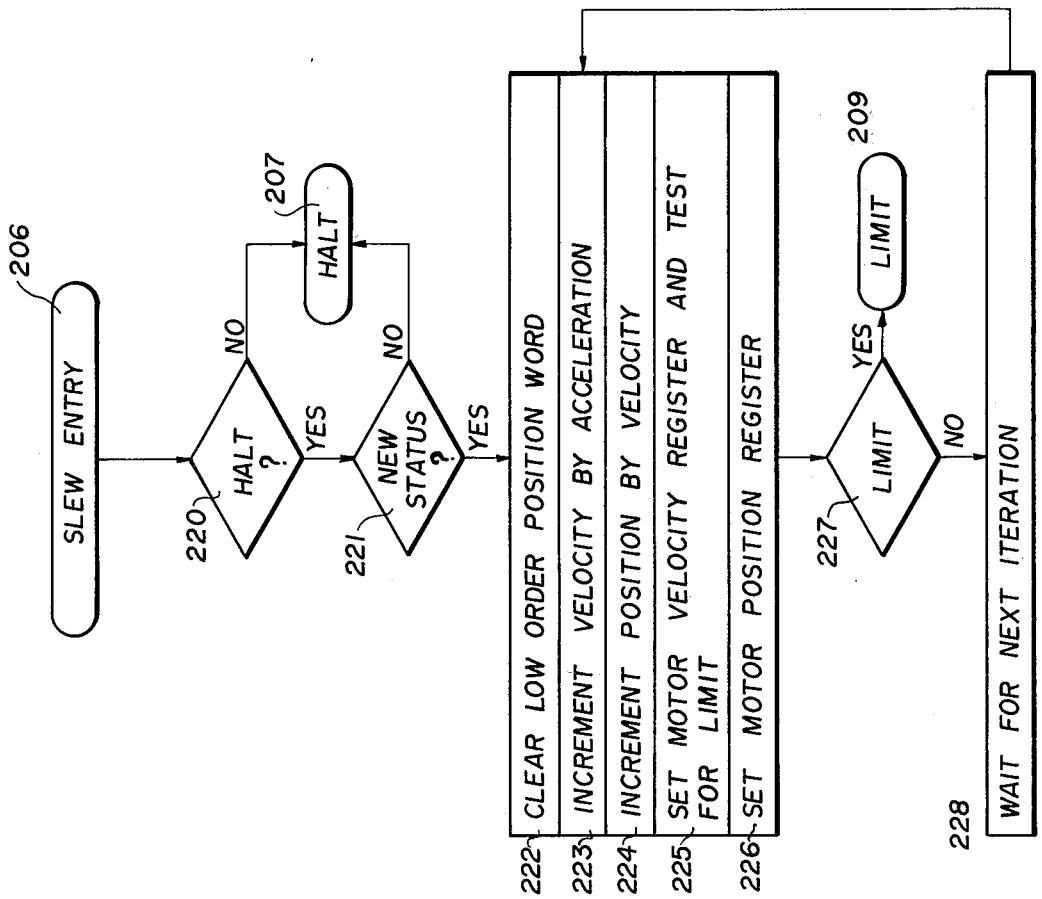
Figure 10E:
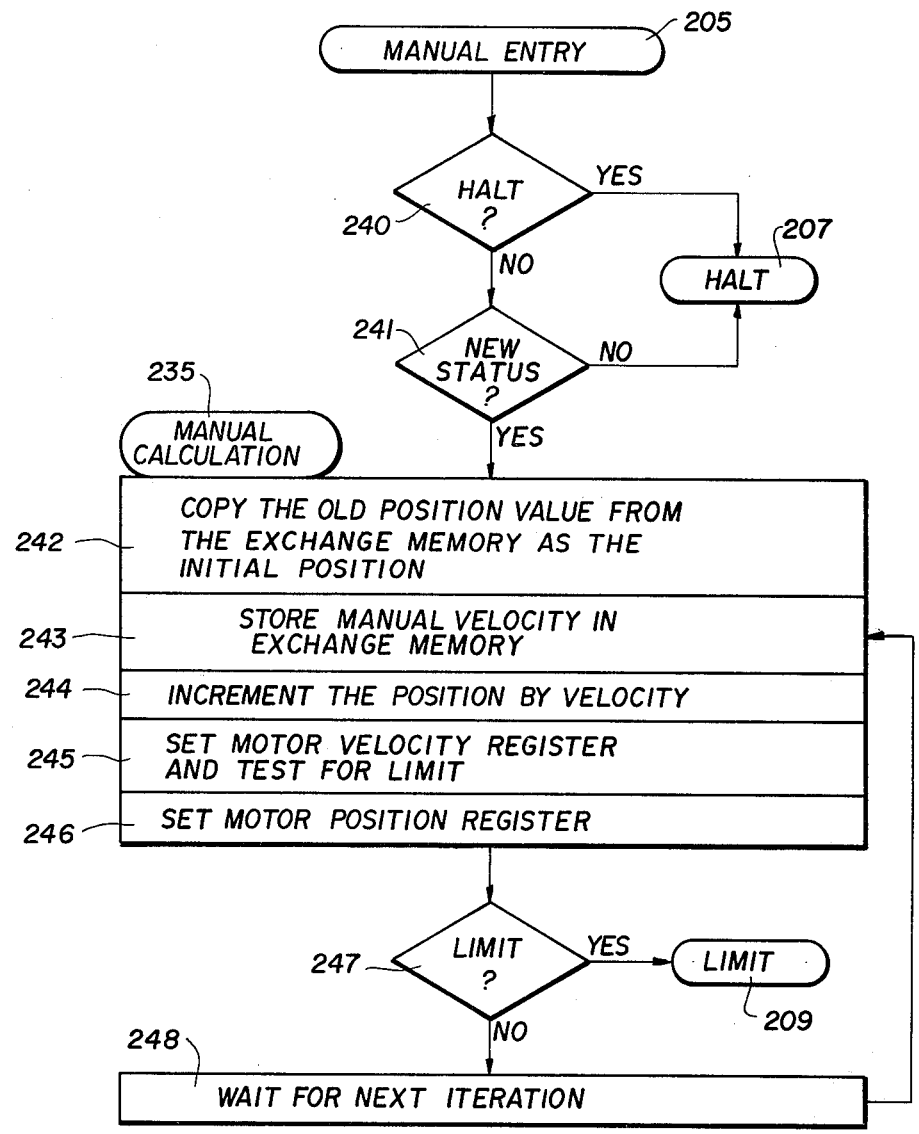

The slew routine 206, FIG. 10C, is a simplified version of the contour routine of FIG. 10B. This routine is used to travel point-to-point rapidly. Consequently, the time between WAIT signals is shorter so that the motor control registers 68 are updated more often. This is required particularly by the stepping motor drive system so that its current waveforms have good fidelity even at high stepping rates thereby minimizing mid-frequency resonance problems. The high rate WAIT signals are supplied by a slew oscillator 47 within the Secondary Computer Controller, FIG. 2. The higher wait signal frequency requires the slew routine to execute faster than the contour routine. This is done by dropping the jerk input and by using position, velocity, and acceleration values of less precision. In all other respects the slew routine of FIG. 10C is the same as the contour routine of FIG. 10B.

The remaining routines of the Secondary Computer uses the computer's versatility in other forms of motor control.

Setting up a numerical control system requires a manual positioning capability. When this is needed the Main Computer 1 puts the Secondary Computer in the position mode 208, FIG. 10D. As in the contour mode, the presence of a new status is checked at block 230. Next, the halt status is checked at 231. If it is set then instead of going to halt directly, the conditions for clearing the halt are checked at blocks 232 and 233. If the motor is stopped and the control input is zero, then the halt is cleared, at block 234, otherwise, the halt routine is executed. Once the halt flag is cleared by the position routine 208, or was never set, then the manual control mode 205 is executed starting with block 242. Alternatively, the manual control method may use the Main Computer 1 to calculate manual control data to be used by the Secondary Computer. This technique would eliminate the program of FIG. 10E which follows.

A method of making the manual control data compatible with computer operations is to manually control the machine via the Secondary Computers and for the Secondary Computers to sample their own operation. This provides digital data without data preparation by the operator. Sampling the position and velocity at the time of film exposure provides all of the necessary information for later reproduction. The Secondary Computer then reproduces the motion by travelling from a position to another position starting at a velocity and ending at another velocity in one interval. A function which can meet all of those requirements is a cubic polynomial.

The manual entry is disclosed here for use with animation stand input. The manual control mode 205 is similar to the position control mode in that it checks for new status and no halt flag, but does not have any means for clearing the halt flag. This is done because a fault such as reaching a limit produces an undesired motion. Having no halt flag clear causes the Main Computer to clear this flag which is done when the operator restarts the manual mode in the Main Computer 1.

After checking the presence of new status and no halt flag at block 240,241, the manual mode routine copies position and velocity from the exchange memory. Since the contour and slew modes use the exchange memory for position, velocity and other variables, this data is maintained in the manual mode. However, in the present mode the Secondary Computer is supplying control data to the exchange memory instead of the Main Computer supplying said data. Consequently, the old axis position is copied from exchange memory locations, for example, within location 240 through 255 to new locations within location 224 through 239. This initialization is executed in block 242. Next, in block 243, the manual control velocity from register 69 is stored in the exchange memory within locations 224 through 239. This data is also used to increment the position, at block 244, to set the velocity register 90 and to test for limit at block 245. The motor position register 80 is then set at block 246. If a limit condition does not exist at block 247, then the Secondary Computer waits until the next iteration interval, whereupon it begins execution at block 243. This operation goes on until a RESTART signal clears the program counter 60 or a limit results.

Figure 10F:
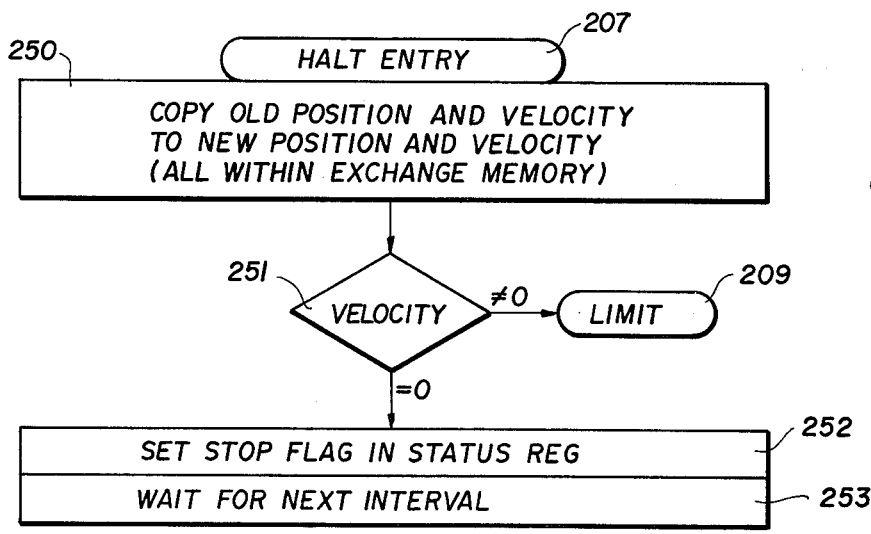

If the halt flag is set because of a limit condition or no new status from the manual mode or routines, or if the Secondary Computer forced a jump then halt routine 207 is executed, FIG. 10F. This routine begins at block 250 by coping the old position and velocity from one location of the exchange memory into the new position and velocity location, the same as block 242 for the same reasons described hereinabove. If the motor velocity is not zero at block 251, the limit mode 209 is executed, otherwise a motor stopped flag is set in the status register 67 at block 252. Then the Secondary Computer simply does nothing until the next RESTART at block 253.

Figure 10G:
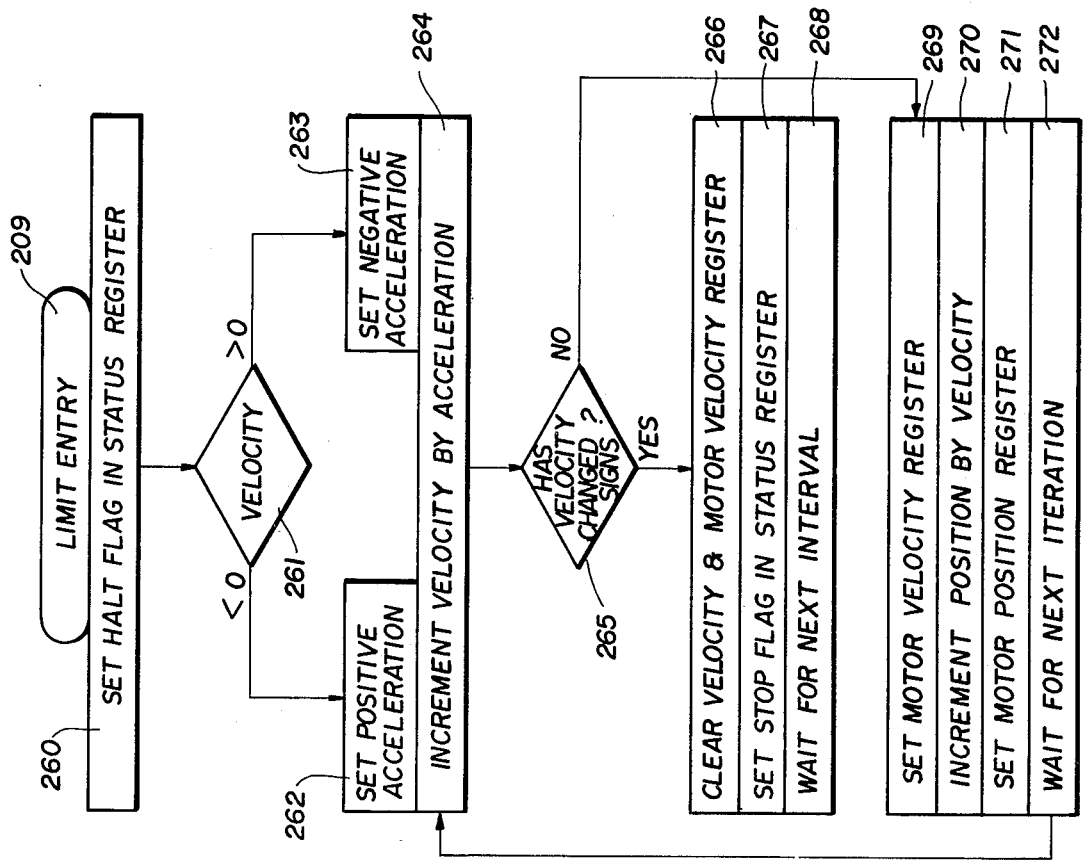

The limit mode 207, FIG. 10G, begins at block 260 which sets the halt flag in the status register 67 of FIG. 5. The motor velocity is tested for sign at block 261 so that a retarding acceleration is a constant with an appropriate sign. More exotic, faster stopping routines can use a constant jerk and an initial acceleration which is dependant upon the velocity at the start of the limiting. In any case, a retarding acceleration is applied to the velocity at block 264. If the velocity changed signs as detected at block 265, then the velocity is set to zero and the motor velocity register 90 is cleared at block 265, the stopped status register flag is set at block 266 and the wait for the next RESTART begins at block 268. If the velocity has not changed sign, the motor velocity register 90 is set with the deacceleration at block 269, the position is incremented by the velocity at block 270, the motor position register 80 is set at block 271 and the wait for the next iteration WAIT signal begins at block 272.

The treatment of position, velocity, acceleration, and jerk in the above explanation of the operation of the Secondary Computer is clarified if the time between WAIT signals is treated as a unitary increment of time, and therefore velocity is in fact the change in position between WAIT signals. Similarly, acceleration is the change in velocity, jerk is the change in acceleration, etc. Let this interval in time be called t, then equations 4 through 6 become:

$$A_n = A_o + nJt \qquad (8)$$

$$V_n = V_o + nA_o t + \tfrac{1}{2}(n)(n+1)Jt^2 \qquad (9)$$

$$P_n = P_o + nV_o t + \tfrac{1}{2}(n)(n+1)A_o t^2 + 1/6(n)(n+1)(n+2)Jt^3 \qquad (10)$$

The Secondary Computer parameters $A_o$ and $J$ may now be determined with equations 9 and 10 ocne $V_o$, $P_o$, $V_n$, $P_n$, n and t are known. Assuming that for the moment, the two equations 9 and 10 are linear in $A_o$ and J and can be solved. The animation stand application fixes the product of nt to the period between movie frames 1/24 second. t is then found from motor driver considerations. A good t for stepping motors is 1/24,000 second; so n equals 1000. The terms $V_o$ and $P_o$ are the present position and velocity which of course are known. The remaining terms $V_n$ and $P_n$, are supplied by numerical integration or by data from the Secondary Computer when it is operated in the manual mode.

Machine tool applications of this system use a variable nt. As McGee U.S. Pat. No. 3,656,124 noticed, there is a problem with matching the end of an interpolation with the end of a block of contour instructions. This readily achievable in the present system by varying n. The proper value for n may be found by solving ntV=D, where V is the contour velocity and D is the contour distance remaining. D may be approximated by the chord between the beginning and end points if the angle of arc remaining is small.

Another consideration for choosing n is integration and extrapolation accuracy. Since ntV/R is the angle traversed in one interpolation ($\theta$), the error maybe calculated, or conversely, for an error limit an n may be found. Accuracy requirements then put an upper limit on n.

A lower limit on n is established by the time required to transfer the control data for the next interpolation interval or sequence. Thus, nt must be greater than this minimum time.

The calculated $A_0$ and J plus the previously known $V_0$ and $P_0$ are combined to form the interpolation point data for cubic extrapolations. Although the inclusion of $V_0$ and $P_0$ is seemingly redundant, it does serve two purposes. First, the Main and Secondary Computers compute values of V and P (this is the source of the redundancy illusion). However, the computers calculate these values in different ways. Different numeric processes give rise to different numerical errors even when calculating the same variable. Thus, the Main Computer either calculate the values of V and P in the manner that the Secondary Computer does to find the errors or the Main Computer can set these values at each interpolation point to limit the propagation of numeric calculation errors to between interpolation points. Since the Main Computer can transmit the values of $P_0$ and $V_0$ much faster than it can simulate the Secondary Computers calculation, the second alternative is better. Second, the maintenance of the absolute position P within the Secondary Computer allows the graceful recovery from an error stop which is not controlled by the Main Computer.

The use of the initial position in the interpolation point data is a radical departure from other stepping motor control data formats. The prior art uses a relative motion format. Vaughn (U.S. Pat. No. 3,690,747), for example, subtracts adjacent desired positions to determine the incremental distance that the stepping motor must move. This incremental distance is then scaled by a constant whose value is dependent upon the motor step size, gearing, lead screw pitch, etc. This scaled incremental distance then becomes the motor control data. This is necessary because prior art stepping motor control systems are naturally incremental and respond to pulse inputs. Conversely, this invention uses a stepping motor drive system responsive to a position value which is related to the absolute position of the stepping motor driven machine member. Thus, to best anticipate the position of the driven member, the control data must include a position value.

OPERATION OF MAIN COMPUTER

Figure 11B:
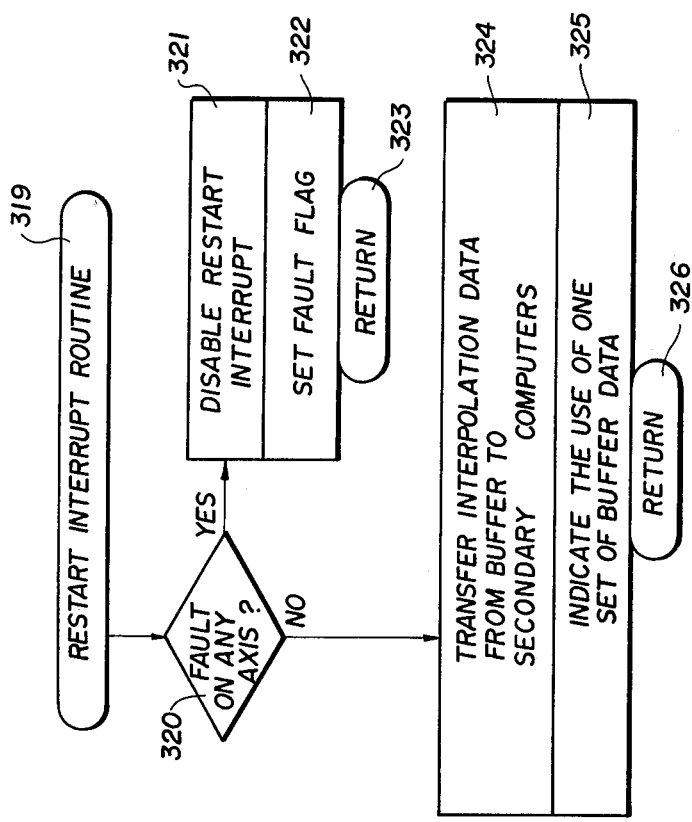
Figure 12A:
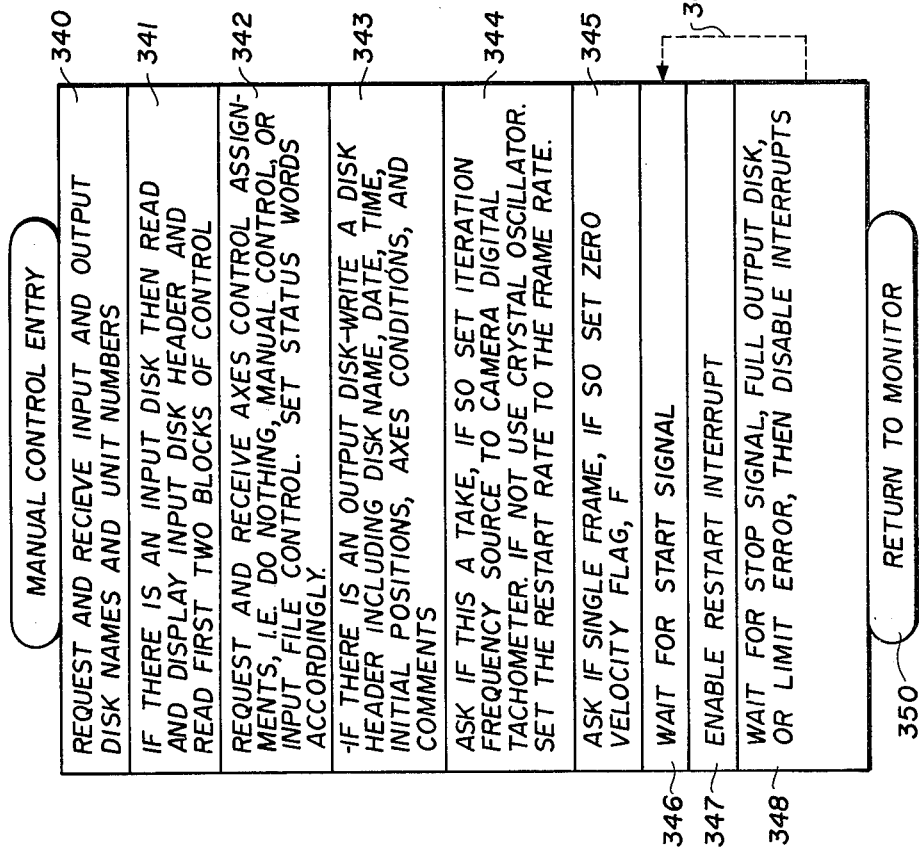
FIGS. 12A and 12B are flow diagrams of the operation of the Main Computer for manual control mode of Secondary Computers.
Figure 12B:
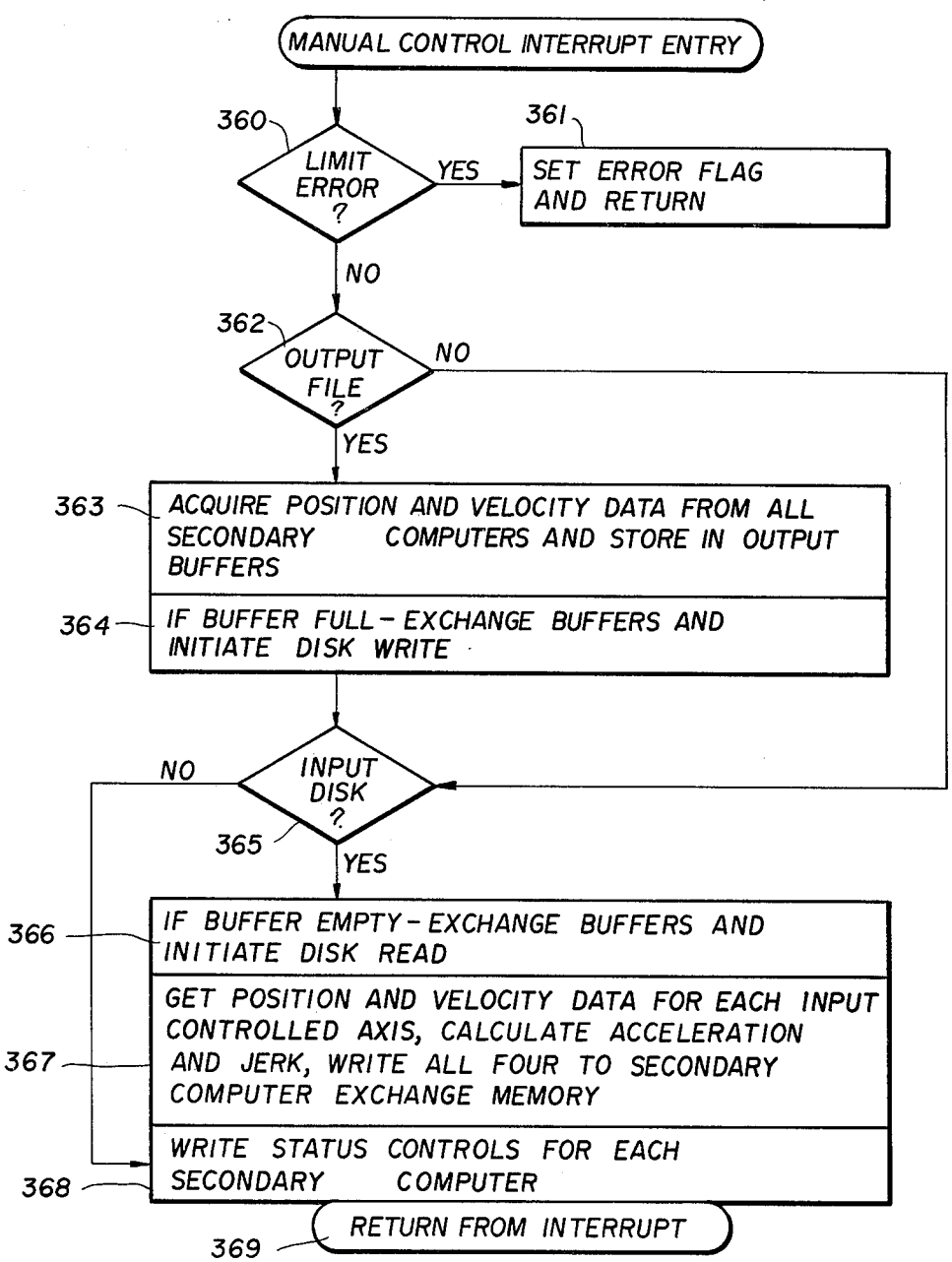

The operation of the Main Computer 1 follows two basic data flows: (a) the flow from the Main Computer to the Secondary Computer characterized by numerical control mode and b) the flow from the Secondary Computer to the Main Computer characterized by manual control mode and reestablishing position data after a limit error. Specific application programming is a variation and/or combination upon these basic themes. The numeric control is illustrated in FIG. 11A AND 11B, while the manual control is illustrated in FIGS. 12A and 12B.

The numeric control mode begins in FIG. 11A with an initialization of the system, at block 300, as needed to set interrupt routine linkages, find the input file, and preposition the machine, etc. Operation may begin after the operator signals that the work piece is in place and all other operation functions have been completed, as at block 301.

The calculations at blocks 302 and 308, must produce control data for the Secondary Computers and the Secondary Computer Controller. The control data for a contouring mode application includes (a) values for position, velocity, acceleration, and jerk for each Secondary Computer, (b) the jump instruction to the Secondary Computer contour routine for each Secondary Computer, (c) a status word including a new status flag for each Secondary Computer, and (d) a valve of the number of iteration, i.e. number of WAIT signals until the next RESTART signal for the Secondary Computer Controller. How this information is calculated depends upon the application. The computation of hyperbolic curve in three axes with cutter compensation is certainly different than computing a straight line without cutter compensation. Alternatively, this may be as simple as transfering data from the input source to the Main Computer. In either case the interpolation point and control data is stored in a buffer area of the Main Computer.

The computations of block 302, continue until the buffer is full as determined by block 303. Then machine operation is initiated by enabling the restart interrupt, at block 304. Nothing can be done until the interrupt occurs, so the computer waits at block 305. The restart interrupt is provided by the routine of FIG. 11B. After the interrupt service routine has executed, a fault check is made at block 306. If there has been a fault, the system aborts to be initialized again at block 300. Alternatively, control could be passed to a routine which attempts to recover and proceed. In either case, if there is no fault, another check on the buffer fill is made at block 307. If the buffer is full, the computer loops back to wait at block 305. Otherwise, another set of interpolation point data is calculated, at block 308. If that was not the last computation to be made, as determined at block 309, the computer loops back to a fault check at 306, otherwise, it proceeds to empty the buffer beginning at block 310 with another fault check. If there is a fault, the control passes back to system initialization at block 300. If there is no fault, a check on the buffer fill is made at block 311. If there is still more interpolation point data in the buffer, the computer can only wait for a restart interrupt at block 312. If there is no further data, the restart interrupts are disabled at block 314, the motors stop and the system waits for the operator at block 301.

The above routine need not employ a buffer. However, the use of the buffer for the interpolation point data produces a less exacting requirement upon the calculation time. Without a buffer, a calculation may take as long as the previous data takes to execute. With a buffer, the average calculation time must be less than the average execution. The size of the buffer sets the range of the average.

The interrupt routine of FIG. 11B controls the distribution of the buffer data. If checks at block 32 for a fault indication from the Secondary Computers, occurring on an INTERRUPT REQUEST from the Secondary Computer Controller 20. If there is a fault, since this implementation aborts operation, the restart interrupts are disabled at block 321. This causes no new status flags to be set. The Secondary Computers consequently go into their halt modes and stop. This is made known to be main routine at block 323. If there is no fault, the interpolation point data is transferred to the Secondary Computers at block 324, an indication of the availability of buffer space is set at block 325, and control is returned to be main routine at block 326.

Manual control mode of this system is charted in FIGS. 12A and 12B. This mode is particularly useful in animation stand applications having an X-Y table for moving artwork and a camera with an adjustable field. Additionally the artwork may be rotated about axes parallel to and perpendicular to the camera axis. Animation stands for cartoon filming also use peg tracks to position the cartoon cells. These tracks may be controlled also. The flow chart of FIGS. 12A and 12B provide full manual control of an animation stand including playback of previous manual operations and the building of a multi-axis manual control file.

The Main Computer 1 requests and receives if available the input file for playback and the output file for recording at block 340. If there is an input file, its header is read and displayed, at block 341. Next, at block 342, the operator supplies control assignments for each axis. An axis may be manually controlled or controlled by an input file. Otherwise, the axis is not controlled and is halted. Now there is sufficient data for writing an output header file at block 343. The operator indicates at block 344 if the camera will film the movement. If so, the time source of the Secondary Computer Control 20 is switched from a crystal oscillator 36 to a digital tachometer on the camera as external feed date input on signal line 39. This provides camera/computer synchronism. Alternatively, the camera may be operated by another motor; in which case the Secondary Computer Control selects a lower frequency crystal source to operate at the slower rate usually found in animation filming. The operator indicates if this is a single frame operation at block 345. If so, a flag is set to force all interpolation end point velocities to zero at block 345. This completes the setup routine. The system waits for the operator to initialize the animation stand and to put the artwork in place at block 346. Enabling the restart interrupt at block 347, starts the manually controlled action. Normally, block 348 inspects the operation flags for errors and waits for the operator to finish. However, when the zero velocity or single frame flag is set, the restart interrupt is disabled and the computer loops to block 346 via path 349 after performing the error checks. When the operator indicates the control is finished, the computer returns control to the monitor, at block 350.

The interrupt routine for block 348 of FIG. 12A begins with a limit check, at block 360 as illustrated in FIG. 12B. If there is a limit, then an error flag is set which will halt operation and control is returned to the main routine at block 361. If there is no limit, the existance of an output file is determined at block 362. If there is an output file, the current positions, and velocities are recorded for all axes from the Secondary Computers using buffering techniques at block 363, including buffer fill check and exchange of block 364. In either case, a check for an input file is made at block 365. If there is an input file, its buffer fill is checked, at block 366. If empty, a new buffer is used. Then, at block 367, each Secondary Computer, which is controlled from the input file, is provided with position, velocity, acceleration, and jerk as calculated from previously recorded positions and velocities using equations 5 and 6. The jump instruction points to the Secondary Computer's contour routine, the status word is flagged new. The remaining axes are controlled at block 368 and the axes which are to do nothing are given a halt status. The manual control axes are provided with the address of the source of manual control, a new status flag and a jump instruction pointing to the manual control routine. Then, the Main Computer returns to the main routine at block 369.

Figure 13B:
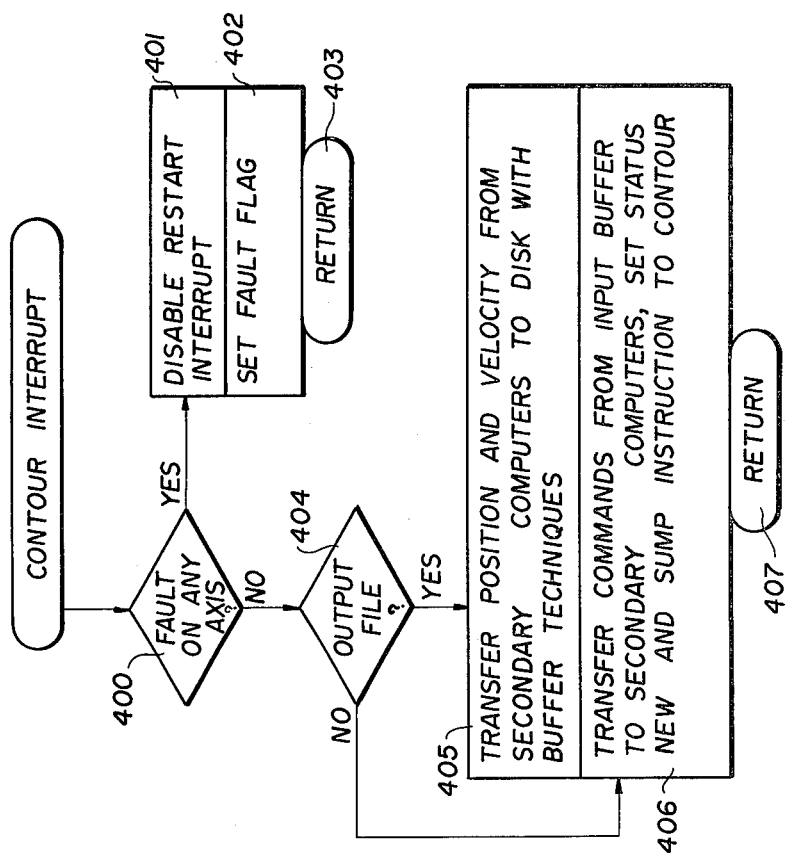
FIGS. 13A and 13B are flow diagrams of the operation of the Main Computer for a connect the dot routine.
Figure 13A:
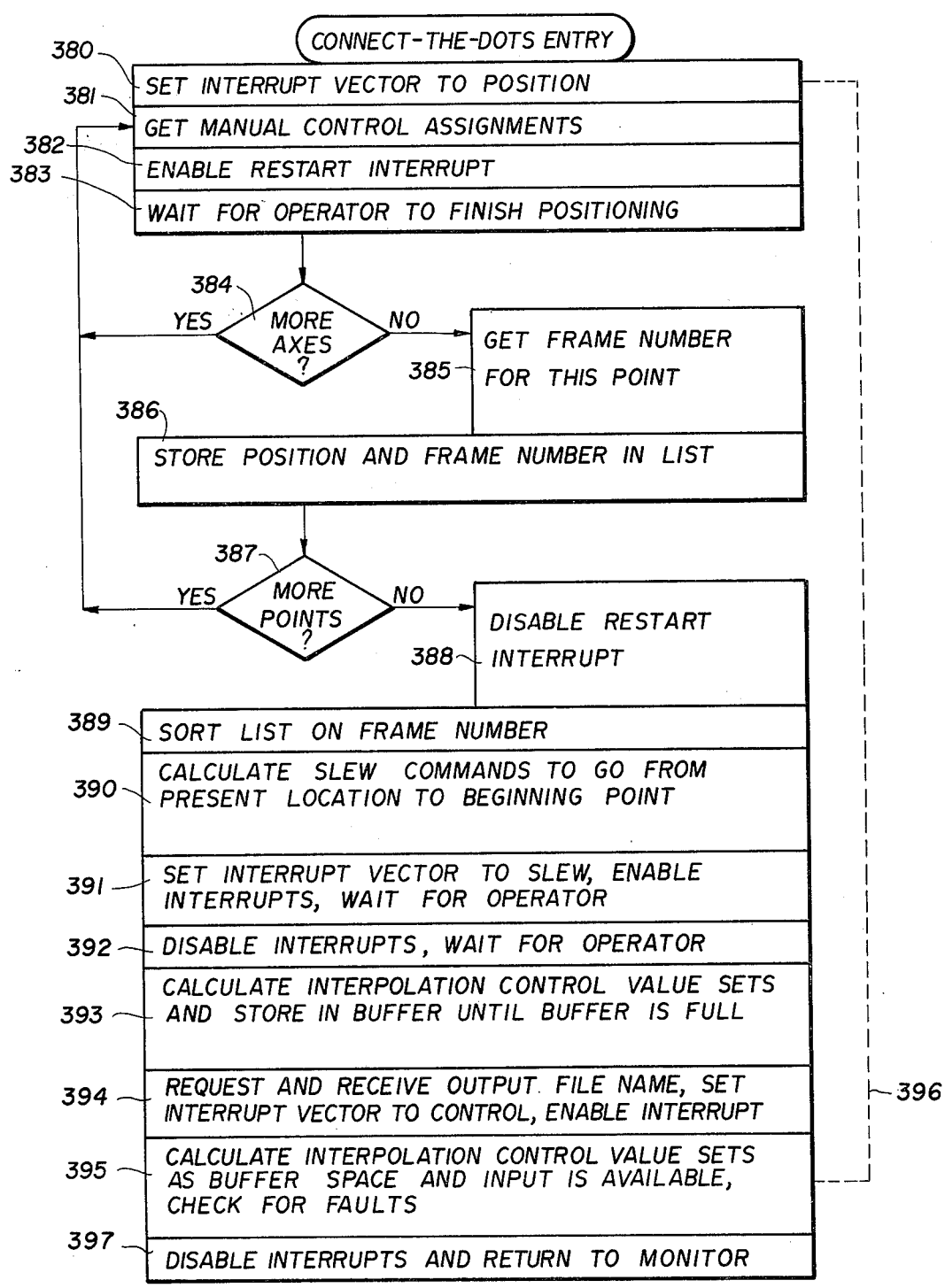

Another routine which shows the versatility of this system in an animation stand application is illustrated in FIGS. 13A and 13B. This routine permits the operator to select a number of machine positions that show the artwork to be filmed best. The operator provides the timing information by associating each position with a frame number. The routine then connects all of these positions with a smooth curve and controls the machine along this curve. The positions are selected under manual control, thereby allowing the operator to visually find the proper point.

The connect-the-dot routine of FIG. 13A begins by initializing the system, in particular by providing the pointer or vector to the first interrupt service routine at block 380. Next, the operator supplies the manual control assignments at block 381, thereby connecting manual controls with the proper Secondary Computers. Then, the restart interrupt is enabled at block 382, allowing the operator to manually position the animation stand axes. During this time, the main program waits at block 383 for the operator to finish adjusting those axes. After the operator signals the computer, it asks the operator if there are more axes to adjust at block 384. If there are, the program loops back to block 381. If there are not, the computer requests the operator to assign a frame number to this point and stores the frame number and the location of each axis in a list at block 385 and 386 respectively. The operator is then asked by the computer if there are more points at block 387. If there are, the program loops back to 381. If there are not, the computer sorts the list of points by their frame number, at block 389, and slews to the first point in blocks 390 through 392. Block 390 calculates all the positions, velocities and accelerations for all axes over sufficient intervals to generate a path back to the first point. Each axis has a trapezoidal velocity profile as found typically in slewing operations. Blocks 391 and 392 provide the appropriate control logic terminating with a wait for operator initiation upon reaching the beginning point.

The dot connection technique is exercised in blocks 393 and 395 in order to keep the buffer of Secondary Computer control data full. After the buffer is initally filled, an output file may be designated at block 394. This file is created to be compatible with manual control inputs so that the moves created by this routine may be built upon with additional manual control. Block 394 not only fills the buffer until there is no more input but also waits until the buffer is empty. Then the interrupts are disabled and computer control returns to the monitor at block 397.

The position interrupt routine used by blocks 380 through 388 of FIG. 13A simply reiterates the status word for each active axis. This status word contains the manual control source address and the new status flag.

The slew interrupt routine used by blocks 391 and 392 of FIG. 13A simply transfer buffer data to the Secondary Computers, sets the new status, and increments a buffer pointer. When the buffer is empty, this routine signals that it is finished.

The contour interrupt routine of FIG. 13B is similar to the interrupt routine for numerical control of FIG. 11B. This routine, however, includes output file handling of blocks 404–407. This produces a file compatible with the manual control input.

An important feature of the use of this system in the animation stand system is the ability to use manual control inputs with previously generated numeric, connect-the-dots, or manual control data. Thus, moves may be built up in a "sound-on-sound" manner.

There are many possible algorithms for the connect-the-dots calculations. Many different functions may be used. However, for smooth curves, i.e. with a continuous velocity, the minimum function is a cubic polynomial for each axis relating the position with time. It is assumed that the first and last points have zero velocity. Since at each point the position is known, the problem is to determine a velocity (which may be specified in some manner by the operator with optional software), one of two situations exist, i.e. the next point has a known velocity or it does not have a known velocity. Since the last point has a known velocity and any point with an unknown velocity will have a point beyond it consequently, it is possible to establish one of two sets of equations following:

$$J\Delta t^3{}_n + A\Delta t^2{}_n + V_{n-1}\Delta t_n + P_{n-1} = P_n$$

$$3J\Delta t^2{}_n + 2A\Delta t_n + V_{n-1} = V_n$$

or $$J\Delta t^3{}_n + A\Delta t_n{}^2 + V_{n-1}\Delta t_n + P_{n-1} = P_n$$

$$J\Delta t_{n+1}{}^3 + A\Delta t_{n+1}{}^2 + V_{n-1}\Delta t_{n+1} + P_{n-1} = P_{n+1}$$

where:
$\Delta t_n = t_n - t_{n-1}$ and
$\Delta t_{n+1} = t_{n+1} - t_{n-1}$
$t_i$ is the time at point i
$P_i$ is the position at point i
$V_i$ is the position at point i. Either of the above sets of equations defines J and A by the solution of two simultaneous linear equation of two unknowns. Then for any time T, $t_{n-1} - T - t_n$.

$$P(t) = J\Delta t^3 + A\Delta t^2 + V_{n-1}\Delta t + P_{n-1}$$

$$V(t) = 3J\Delta t^2 + 2A\Delta t + V_{n-1}$$

where:
$\Delta t = T - t_{n-1}$

This then may be solved at various frame times between points $n-1$ and n to provide the data required for the calculations to produce a set of interpolation point data for the Secondary Computer as discussed hereinabove.

HARDWIRED SECONDARY COMPUTER

Figure 14:
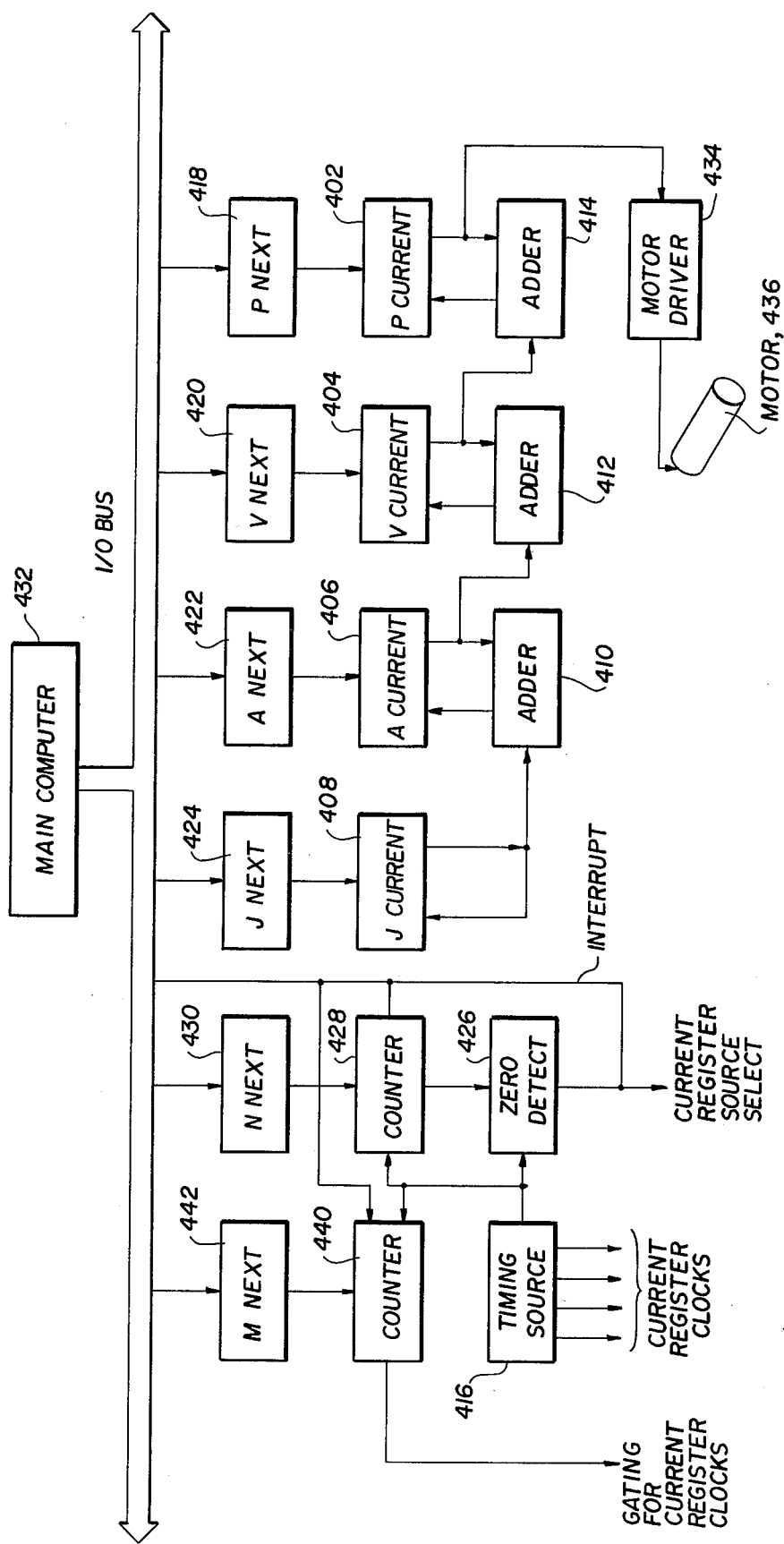
FIG. 14 is a block diagram of a hardwire embodiment of the Secondary Computer incorporating the principles of the present invention.

Although the system of FIG. 1 uses programmable Secondary Computers 10 and 11 and a sophisticated Secondary Computer Controller 20 for the polynominal calculations or generations of a sequence of driver command signals, the system can be implemented using hardwired circuits as illustrated in FIG. 14.

This system consists of a register 402 for storing the current value of P, the desired motor position; a register 404 for storing the current value of V, the first order difference of position or approximately motor velocity; a register 406 for storing the current value of A, the second order difference of motor position or approximately acceleration; and a register 408 for storing the current value of J, the third order of difference of position or approximately jerk. Adder 410 sums A and J to update $A_c$ in register 406. Adder 412 sums A and V to update V in register 404. Finally, adder 414 sums V and P to update $P_c$ in register 402. This sequence of additions occurs once during each cycle of the timing source 416 except for the first cycle or iteration of an interval. During this cycle the current value registers get new data from the buffer registers 418, 420, 422 and 424 which hold the next value to be operated upon. This cycle is determined by the zero detector 426 which examines the counter for its zero state. Additionally, the zero detector initializes the counter 428 to the value in the $N_{next}$ register 430 and interrupts the Main Computer 432. The Main Computer then provides new next values of N, J, A, V and P by performing data out operations to registers 430, 424, 422, 420 and 418 respectively.

The timing source 416 produces several clock signals for the current value registers 402, 404, 406, and 408. To produce the mathematics operations as stated above, the current A register is clocked slightly (approximately 500 nanoseconds) before the clocking of the V register. Similarly, the V register is clocked before the P register. If these registers were clocked at the same time, the mathematics would become:

$$A_{n+1} = A_n + J$$

$$V_{n+1} = V_n + A_n$$

$$P_{n+1} = P_n + V_n$$

This will produce similar but different operation, for initial values J, A, V and P,
$$P_n = P + nV + \tfrac{1}{2}n(n-1)A + 1/6n(n-1)(n-2)J$$

providing n 2, however $$P_1 = P + V$$

$$P_o = P$$

Although the above expressions use $n-1$ and $n-2$ instead of $n+1$ and $n+2$, the corresponding terms have the same order polynomial in n and provides the same general effects.

The overall purpose for this calculation circuitry is to provide position and velocity information to a servo system disclosed here as a stepping motor driver 434 and motor 436.

Further variations may be made upon FIG. 1. For example, counter 440 may be used to supply a gating signal for turning on or off the clock pulses to, for example, the A and J registers. Counter 440 increments once for each cycle of the timing source 416 and is initialized once per interval from $M_{next}$ register 442 just as counter 428 is initialized from 430. The most significant bit of counter 440 is used to control the register clocks. This bit may, of course, change as the counter is being incremented. This change may gate on or may gate off the clock pulses to the A and J registers. This will create a mid-interval breakpoint in the calculation from or to a linear interpolation. Care must be taken with this signal that the clocks are not gated off when the current registers are updated from the next value registers.

The registers and adders 402-414 and 418-424 perform the functions of the programmable Secondary Computers of FIG. 1 by incrementing acceleration with jerk, velocity with acceleration, and position with velocity to provide a polynominal calcuation. The remaining registers, counters and circuit elements provide the sequence timing and number of iteration functions of the Secondary Computer Controller of FIG. 1.

Thus, the entire Secondary control system may be hardwired. However, examine the hardware usage. The timing source frequency need not be greater than 50,000 Hz and thus, each adder has nearly 20 microseconds to produce its sum. However, a transistor-transistor logic adder will produce its sum in less than 0.2 microseconds. This represents about a 1% efficiency which may be raised by passing all values through a single adder. The design for a single adder system rapidly simplifies to a programmable computer, albeit a specially designed programmable computer. The programmable computer with its higher componet usage has few parts than a hardwired system—thereby reducing costs and improving reliability.

SECONDARY COMPUTER CONTROLLER WITH DECELERATION

The first embodiment employed a relatively general purpose programmable computer as the Secondary Computer to perform the iterations between interpolation points from the Main Computer. The second embodiment used all hardware, no computer techniques, to perform a polynomial calculations. Further examination of the first embodiment shows that a single Secondary Computer can operate multiple motors with fewer parts than the first embodiment and some of the tasks performed by the Secondary Computer of the first embodimentcan be performed elsewhere.

The first embodiment had many modes of operation including a halt mode. This mode was used if an axis actuated a limit switch which would be placed prior to a mechanical limit. Instead of the limit switch asserting a signal on a Secondary Computer sense line, that computer going into a limit mode and notifing the Main Computer of the error, and the Main Computer putting all other axes into a halt mode, the third embodiment controls the iteration frequency. Just as the manual feedrate control can control motion by adjusting the iteration rate, the motion can be halted by reducing the iteration rate to zero. However, this should be done gradually since a drop in iteration rate causes a deceleration and motors, particularly stepping motors, do not work with large decelerations.

Figure 15:
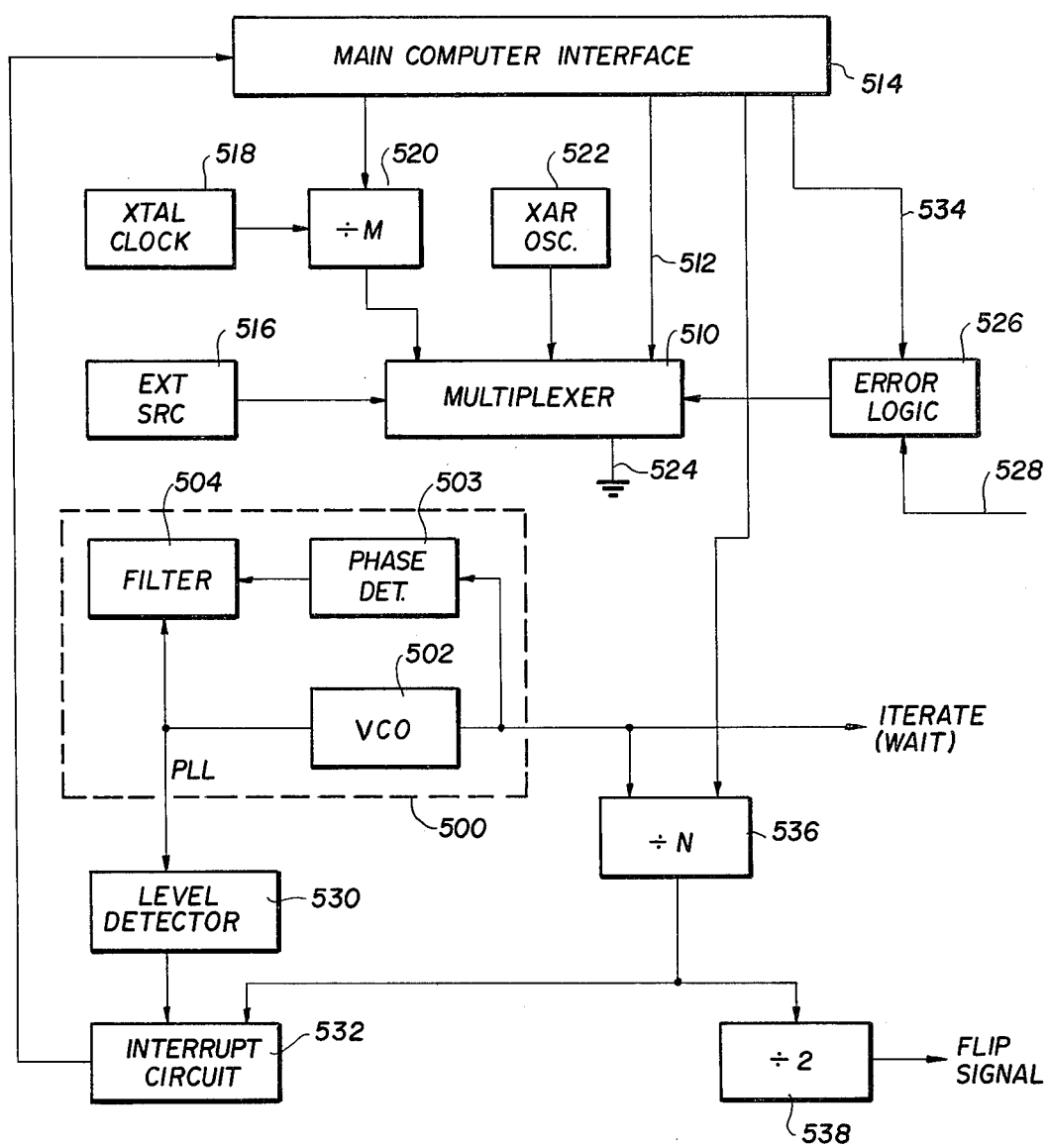
FIG. 15 is a block diagram of another embodiment of the Secondary Computer Controller.

FIG. 15 depicts a Secondary Computer Controller or timing source with the capability of going to zero frequency upon receipt of an error signal. The basis for this circuit is a phase lock loop 500 consisting of a voltage controlled oscillator 502, a phase detector 504, and a filter, 506. The phase lock loop is put in after the timing source multiplexer 510, which is controlled via address lines 512 from the Main Computer interface 514. As in FIG. 2, this multiplexer choses among an external source 516, a crystal controlled source 518 and a variable frequency oscillator 522. A Main Computer controlled divider 520 interconnects the crystal controlled source 518 and multiplexer 510. Additionally, the multiplexer may choose a zero frequency source such as ground 524. Error logic 526 produces a select signal to multiplexer 510 upon receipt of an error signal 528 from an axis limit switch or other error source. This select signal forces the multiplexer's output to zero frequency. Without the phase lock loop 500, the iteration rate would drop instantly to zero. If this happened to a stepping motor control when the motor is operating faster than its start/stop rate, synchronization would be lost. The phase lock loop filter 504 limits the loop response time and consequently limits the motor deceleration rate. When the voltage controlled oscillator's input falls below the zero frequency level, the level detector 530 signals the interrupt circuit 532 which ultimately interrupts the Main Computer to indicate an error has occured. The Main Computer may then, via an interface 514 and signal path 534, reset the error logic 526. The timing signal is completed with a programmable frequency divider or module counter 536 which counts interation commands or wait signals to compute the end of an interval. The counter 536 produces a computer interrupt via 532 and 514 and toggles the memory map flip signal by triggering or toggelling flip flop 538.

The deceleration characteristic is determined by the type of filter and the type of phase detector used. Preferably, the filter is an integrator and the phase detector is a Radio Corporation of America CD 4046 Type II. This combination provides a linear deceleration. Additionally, it is advantageous to use a non-linear voltage controlled oscillator to provide an optimum deceleration characteristic.

SPECIALLY DESIGNED SECONDARY COMPUTER

The programmable Secondary Computer can run faster if the program memory and the data memory where separate instead of combined as in the typical general purpose computer. The computer can also effectively run faster if its instructions are more powerful, thereby reducing the number of instructions. Since the program memory word length is independent of the data memory word length, an instruction format is free to grow. An optimal arrangement for the Secondary Computer is to combine an arithmetic operation with a conditional jump instruction since nearly a third of the instructions in the Secondary Computer iteration program are jumps. This presents no problem since this hardware is in this architecture.

Secondly, the first embodiment does not optimimly operate on multiple precision arithmetic for the calculation of:

$$A_{n+1} = A_n + J$$

$$V_{n+1} = V_n + A_{n+1}$$

$$P_{n+1} = P_n + V_{n+1}$$

The first embodiment calculated all words in the first multiple precision sum before going to the second sum. This requires the destruction of information already in the accumulator by a load instruction. Alternatively, if that information can be used immediately, a subsequent load instruction may be eliminated. This can be done by doing all of the above algolrithms simultaneously, as will be explained more fully below. This does require a feature not found on prior art computers, namely, multiple addressable carry flip-flops. Each carry flip-flop is assigned to an algolrithm or equation. In this case, carry flip flop number 3 is assigned to jerk; 2 to acceleration; 1 to velocity; and 0 to position.

Another savings in program time is to make only those calculations which are absolutely needed. For example, while the calculation should have sixty four bits of precision, the upper thirty two bits of jerk and acceleration will only be the sign bit. Similarly, the upper sixteen bits of the velocity will just be the sign bit and the least significant sixteen bits of the position will never affect the motor position. While the least significant sixteen bits of position may be simply ignored, the sign bit poses a problem. This is solved by storing the sign in multiple addressable sign flip flops just as the carry is stored. Then, these flip flops can be tested by a jump subinstruction for appropriate action. This action is one of two special load instructions, namely (a) load accumulator with contents of memory and add carry and (b) load accumulator with contents of memory less one and add carry. This performs the same operation as a load instruction and an add with carry instruction where one of the arguments is a word equal to the sign bit, i.e. all zeros or all ones. The two special load instructions can be implemented with a standard 74181 integrated circuit arithmetic logic unit and with proper control inputs.

Index registers have been used effectively in computers for dealing with many variables in the same manner. The third embodiment of the Secondary Computer also uses an index register, but is much more imbedded in the computer by simultaneously affecting memory addresses, data output, and a jump instruction.

Figure 16:
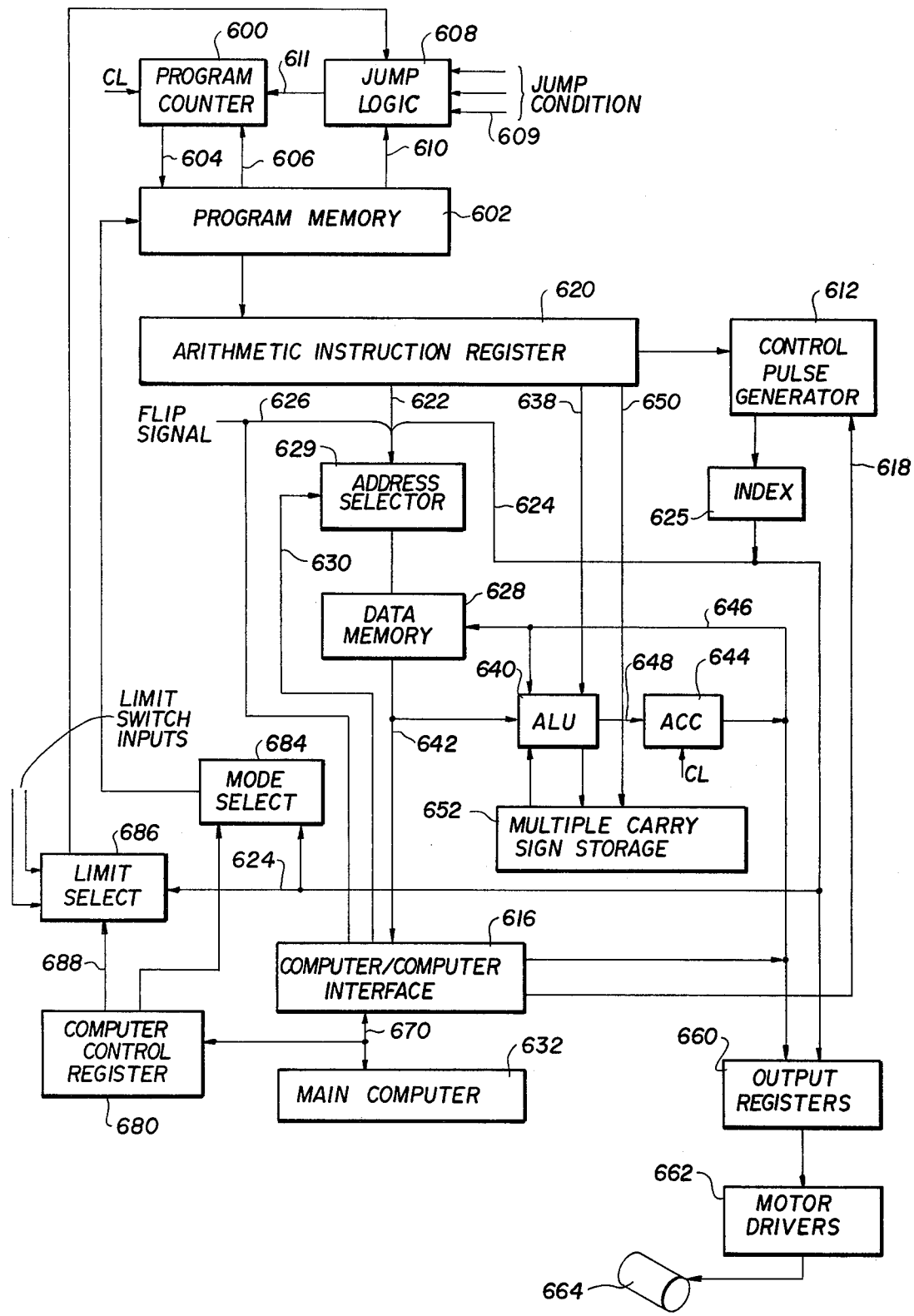
FIG. 16 is a block diagram of a specially designed programmable Secondary Computer.

Basically, a computer can be optomized by designing it to meet a narrow range of tasks, just as hardwired logic can be quite efficient at a single task. The programmable computer of FIG. 16 is precisely such a computer. This computer, as all programmable computers, has a program counter 600 which addresses a program memory 602 via 604. Each program instruction in this disclosure contains a jump instruction destination which is feedback to the data inputs of the program counter 600 via 606. Each instruction also has a jump mode which is signaled to the jump logic 608 via 610. The jump logic produces a data load signal via 611 to the program counter 600 if the selected jump condition is true. The jump logic 608 tests logic states both within and beyond the Secondary Computer as noted by the additional inputs 609. Examples of the jump instructions are unconditionally jump, unconditionally do not jump, jump if accumulator is equal zero, jump if accumulator is negative, jump if sign bit in storage 2 is a one, jump if limit switch is activated, and jump if index is zero and too early for the next iteration. The program counter 600 derives its clock (CL) from the control pulse generator 612. This gating is required for a cycle stealing operation performed by the computer-computer interface 616 as requested by signal via 618.

The portion of the instruction dealing with arithmetic operations is stored in an arithmetic instruction register 620 so that an instruction cycle need not include the response times of the program counter 600 and the program memory 602. Thus, instruction register 620 allows overlap of the fetch and execution portions of a computer instruction.

The arithmetic subinstruction contains four address bits 622 which are joined by three index bits 624 from index register 625 and one flip bit 626 from the Secondary Computer Controller to address a 256 word data memory 628 via address selector 629. The index 625 divides the data memory 628 into eight sections, one for each of eight possible motors. The flip bit divides each of the eight sections in half, one for current data, and one for new or next interval data similarly to the technique of FIGS. 3 and 4. Each of the section halves has sixteen words of storage, enough for all of the motor control variables. The address selector 629 in response to the control pulse generator 612 selects its address from the combination of 622, 624, and 626 or address 630 from computer-computer interface 616 for a computer-computer data interchange. The memory map flip signal 626 is used by the interface 616 to modify address 630 to that the flip signal selection of memory words is transparent to the Main Computer 632 as it is invisible to the Secondary Computer.

The arithmetic instruction register 620 supplies two bits 638 to the arithmetic logic unit (ALU) 640 which select the calculation mode, i.e., load, add, substract, and load decremented. The arithmetic logic unit accepts data from the data memory 628 via 642 and from the accumulator 644 via 646. The arithmetic logic unit results on line 648 is stored in the accumulator 644 when the accumulator clock pulse is generated by control pulse generator 612.

Any computer capable of multi-word precision arithmetic employs a flip flop to store the carry from one operation to the next. Having a single carry bit is not optimal because it forces the loading of data in the accumulator which could otherwise be used. Table I shows the list of instructions taken by a typical single address computer to compute:

$$A = A + J$$

$$V = V + A$$

$$P = P + V$$

in quad precision.

TABLE I

| LOC | SINGLE ADDRESS INSTRUCTION | VARIABLE |
|---|---|---|
| 1. | Clear & Add | $J_0$ |
| 2. | Add & Store | $A_0$ |
| 3. | Clear & Add | $J_1$ |
| 4. | Add w/ Carry & Store | $A_1$ |
| 5. | Clear & Add | $J_2$ |
| 6. | Add w/ Carry & Store | $A_2$ |
| 7. | Clear & Add | $J_3$ |
| 8. | Add w/ Carry & Store | $A_3$ |
| 9. | Clear & Add | $A_0$ |
| 10. | Add & Store | $V_0$ |
| 11. | Clear & Add | $A_1$ |
| 12. | Add w/ Carry & Store | $V_1$ |
| 13. | Clear & Add | $A_2$ |
| 14. | Add w/ Carry & Store | $V_2$ |
| 15. | Clear & Add | $A_3$ |

TABLE I-continued

| LOC | SINGLE ADDRESS INSTRUCTION | VARIABLE |
|---|---|---|
| 16. | Add w/ Carry & Store | $V_3$ |
| 17. | Clear & Add | $V_0$ |
| 18. | Add & Store | $P_0$ |
| 19. | Clear & Add | $V_1$ |
| 20. | Add w/ Carry & Store | $P_1$ |
| 21. | Clear & Add | $V_2$ |
| 22. | Add w/ Carry & Store | $P_2$ |
| 23. | Clear & Add | $V_3$ |
| 24. | Add w/ Carry & Store | $P_3$ |

NOTES:
$A_o$ is the least significant word of number A, and $A_3$ is the most significant word. Similarly, $V_o$ through $V_3$ form the number V, $P_o$ through $P_3$ form the number P, and $J_o$ through $J_3$ form the number J.

Notice in Table I that instructions 3 and 4 must follow instruction 2 to preserve the carry. Similarly, 5 and 6 must follow 4, etc. Thus, it takes eight instructions to add jerk J to acceleration A in quad precision. However, the value in the accumulator at the end of instruction 2 of Table I is restored by instruction 9. If the carry bit for $A_o$ could be preserved, instruction 10 could be placed after 2 thereby eliminating the need for instruction 9 and thereby eliminating the time requirement of instruction 9. Similarly, instructions 11, 13 and 15 can be eliminated and instructions 12, 14 and 16 placed after instructions 4, 6 and 8. The same is true for incrementing position P with velocity V, namely, instructions 17, 19, 21 and 23 may be eliminated and instructions 18, 20, 22 and 24 follow instructions 10, 12, 14 and 16.

This multiple carry storage and selection can be implemented with a memory or an addressable latch such as a TTL 74LS259 combined with a multiplexer such as a TTL 74LS 151 illustrated in FIG. 16 as multiple carry/sign storage 652. The arithmetic instruction register 620 via 650 provides two bits to address the multiple carry/sign storage 652. Another bit on 650 selects the carry input from the multiplexed latch or the forth bit on line 650. Now Table I may be changed or reduced to Table II. Notice that eight instructions have been eliminated from Table I, namely 9, 11, 13, 15, 17, 19, 21, and 23 and a selection of a carry latch or flip flop for each variable is added.

Further analysis of the motor control shows that some of the sixteen words making up the J, A, V, and P numbers have little significance. In fact, $J_3$, $J_2$,$A_3$,$A_2$,$V_3$, contain only all zeros or all ones according to their respective sign bits. Also, the least significant sixteen bits of position $P_o$ will not affect motor control and thus, can be eliminated. One could eliminate the instructions 9, 10, 13, 14, and 15 form Table II for these words if there were some means of extending the sign bit of one word in the accumulator prior to the addition. However, a sign extension instruction can be eliminated if the operations can be built into other instructions. It has already been disclosed that this computer has an independent jump subinstruction within each instruction. This instruction can test a sign bit stored in an addressable lach in the same manner as the carry is stored. Thus, when a new value of $A_1$ is calculated, the sign of A is deposited in the number two latch for sign bits as zero or one. For the program of Table II, instruction 10 would load the accumulator with all zeros or all ones depending upon the sign. If zero, instruction 10 could be eliminated and instruction 11 can be replaced by a load with carry and store instruction. If all ones which is -1 numerically, instruction 10 could be eliminated and instruction 11 can be replaced by a load minus one with carry and store instruction. By testing the sign bit stored, the jump, of course, can decide which of the two instructions 11 should be executed. The same relationship is valid for instructions 15 and 16 for $V_3$ and $P_3$.

TABLE II

| Loc | Instruction | Carry Select | Variable |
|---|---|---|---|
| 1. | Clear & Add | 3 | $J_o$ |
| 2. | Add & Store | 2 | $A_o$ |
| 3. | Add & Store | 1 | $V_o$ |
| 4. | Add & Store | 0 | $P_o$ |
| 5. | Clear & Add | 3 | $J_1$ |
| 6. | Add w/ Carry & Store | 2 | $A_1$ |
| 7. | Add w/ Carry & Store | 1 | $V_1$ |
| 8. | Add w/ Carry & Store | 0 | $P_1$ |
| 9. | Clear & Add | 3 | $J_2$ |
| 10. | Add w/ Carry & Store | 2 | $A_2$ |
| 11. | Add w/ Carry & Store | 1 | $V_2$ |
| 12/ | Add w/ Carry & Store | 0 | $P_2$ |
| 13. | Clear & Add | 3 | $J_3$ |
| 14. | Add w/ Carry & Store | 2 | $A_3$ |
| 15. | Add w/ Carry & Store | 1 | $V_3$ |
| 16. | Add w/ Carry & Store | 0 | $P_3$ |

Thus, Table II becomes instructions 1 through 14 of Table III. Notice that the sixteen instructions of Table II have been reduced to twelve by eliminating instructions for $J_3$,$J_2$,$A_3$,$A_2$,$V_3$ and $P_o$. Of those twelve only ten are executed in any iteration, since instructions 7 and 12 test the stored sign bits S2 and S1 respectively to execute either instruction 10 or 11 and 13 or 14 respectively. These sign bits are created in instructions 5 and 10 or 11 respectively. The definition of the instruction of Tablee III are contained in Table IV.

The Secondary Computer by using a multiple carry store and a multiple sign store has reduced a twenty four instruction program to one which only executes ten instructions, resulting in a 58% savings for very little extra hardware.

The output of this Secondary Computer is a value placed in an output register or registers 660 by the accumulator output 646. The particular output register may be selected by bits in the arithmetic instruction register 620 to indicate position or velocity and which of the four multiprecision word segments, or by the index 625 to indicate which of eight possible motors, or by both. A bit in the arithmetic instruction register 620, when set in an instruction, causes a clock pulse to exit the control pulse generator 612 and clock its associated register within 660. The motor register selected by the index 625 responds by copying the accumulator 644. One bit in the instruction register controls the position registers, another may control the velocity registers if both signals are to be outputted as driver command signals to motor drivers 662 and ultimately motor 664.

TABLE III

| | | | CONSTANT JERK | | | |
|---|---|---|---|---|---|---|
| Loc. | Arith. Op. | Memory Store? | Carry In? | Carry Select | Variable | Jump Op. | Jump Destination |
| 0 | NOP | NO | NO | $\phi$ | $\phi$ | NOGO | $\phi$ |
| 1 | LOAD | NO | NO | 3 | $J\phi$ | NEVER | 2 |

TABLE III-continued

CONSTANT JERK

| Loc. | Arith. Op. | Memory Store? | Carry In? | Carry Select | Variable | Jump Op. | Jump Destination |
|---|---|---|---|---|---|---|---|
| 2 | ADD | YES | NO | 2 | A$\phi$ | NEVER | 3 |
| 3 | ADD | YES | NO | 1 | V$\phi$ | NEVER | 4 |
| 4 | LOAD | NO | NO | 3 | J1 | NEVER | 5 |
| 5 | ADD | YES | YES | 2 | A1 | NEVER | 6 |
| 6 | ADD | YES | YES | 1 | V1 | NEVER | 7 |
| 7 | ADD | YES | YES | $\phi$ | P1 | S2 | 11 |
| 10 | LOAD | YES | YES | 1 | V2 | ALWAYS | 12 |
| 11 | LOAD-1 | YES | YES | 1 | V2 | NEVER | 12 |
| 12 | ADD | YES | YES | $\phi$ | P2 | S1 | 14 |
| 13 | LOAD | YES | YES | $\phi$ | P3 | ALWAYS | $\phi$ |
| 14 | LOAD-1 | YES | YES | $\phi$ | P3 | ALWAYS | $\phi$ |
| 15 | NOP | NO | NO | $\phi$ | $\phi$ | ALWAYS | $\phi$ |
| 16 | NOP | NO | NO | $\phi$ | $\phi$ | ALWAYS | $\phi$ |
| 17 | NOP | NO | NO | $\phi$ | $\phi$ | ALWAYS | $\phi$ |

Notes:
This program calculates:
$A_{n+1} = A_n + J$
$V_{n+1} = V_n + A_{n+1}$
$P_{n+1} = P_n + V_{n+1}$
with J, A, V and P in multiple precision
A, J have 32 bits right justified
V has 48 bits right justified
P has 48 bits shifted left 16 bits.
The index is incremented on instructions 13 and 14.
The velocity output register is set on instructions 10 and 11.
The position output register is set on instruction 12.

TABLE IV

| | Instruction Meanings |
|---|---|
| Loc | The program memory address of this instruction. |
| Arith. Op. | The command given to the arithmetic logic unit and the accumulator<br>NOP = Do Nothing<br>Load = Pass argument through ALU and set the accumulator.<br>Add = Add argument to accumulator & set the Accumulator with the sum.<br>Load 1 = Decrement the argument and set the accumulator. |
| Memory Store? | Should the result of arithmetic operation be stored back into the argument location? |
| Carry In? | Should the selected carry be included in the arithmetic operation? |
| Carry Select | The address of a carry bit and sign bit storage memory. The carry and sign bits produced by the arithmetic operation are stored at the selected address. The carry bit is also retrieved by the same address. |
| Variable | Argument to arithmetic operation. |
| Jump Op. | The condition which will cause the program counter to assume the jump destination value instead of the next sequential value.<br>NOGO = If the index is not zero or if the timer has not requested an iteration.<br>NEVER = Always go to next sequential instruction<br>S1 = If the sign bit in sign/carry store, address 1 is a one then go to the jump destination<br>S2 = If the sign bit in the sign/carry store address 2 is a one then go to the jump destination.<br>ALWAYS = Always go to the jump destination.<br>EQ = If the accumulator is zero go to the jump destination.<br>LT = If the accumulator is less than zero go to the jump destination.<br>HALT = If the limit switches are enabled and a limit switch addressed by the index is activated then go to the jump destination. |
| Jump Destination | The location of the next instruction if the jump condition is satisfied. |

The Main Computer 632 may include the Secondary Computer in its repretory of input/output devices or may, preferably, include it in its memory address space. In the case of connecting the Secondary Computer to a Digital Equipment Corporation LSI-11 Main Computer, the computer-computer interface 616 examines the address bits on but 670 for values assigned to the Secondary Computer. When one of these addresses appears, the interface 616 flags the control pulse generator 612 via 618 that a cycle steal is required. When the currently executing instruction finishes, the control gating performs the memory operation as dictated by the interface 616 via 618. Thus, the Secondary Computer memory is duel ported. This technique works if the Secondary Computer is fast and the Main Computer 632 is tolerant of the necessary synchronization delays. The LSI-11 and other PDP-11 computers are.

The Main Computer can alter the operation of the Secondary Computer with a control register 680. One technique is to use such register to address the program memory 602. Then the Main Computer can select a program in the program memory. There are situations however, that some motors need to be controlled in one manner and another motor in a different manner. A mode select multiplexer 684 is addressed by index 625 via 624 and selects one or more bits in the control register 680 for addressing the program memory 602.

Such an alternate mode program is listed in Table V. This program is designed for slewing a machine member to a remote point or for finding an axis limit and thereby establish an absolute reference. The slewing operation requires acceleration to some velocity, running constantly at that rate and then decelerating to a stop. The optimum breakpoint between constant velocity and constant acceleration may be within an interval. The computer can then count to determine the exact location of the breakpoint.

The program of Table V begins with a test to determine if it should proceed. If the index is not zero or if the timing source has indicated an iteration should begin then instruction 1 is executed next otherwise this test is done again. Instruction 1 loads the counting increment INC into the accumulator. If this is zero, then the constant acceleration program is used automatically. Instruction 2 adds the count, N, to the increment to find a new count value. If the result is negative, the constant velocity code is entered, otherwise, the constant acceleration code is used. Note that by proper selection of N and INC, the breakpoint can go either way, i.e. N positive and INC negative creates a break from constant velocity to constant acceleration. The remaining code is the implementation of:

$$V_{n+1} = V_n + A$$

$$P_{n+1} = P_n = V_{n+1}$$

and $$P_{n+1} = P_n + V_c$$

Instructions 3 and 13 sense the limit switch as addressed by the index and causes the iteration to be skipped by jumping to instruction 17 whose only function is to increment the index.

The limit switch jump instructions are made possible by the limit switch select 686 which is addressed by the index 625 via 624. The Computer control register 680 via 688 enables individual limit switches before selection by the index. The resulting output via 690 is used by the jump logic 608.

Interpolators built with rate multipliers must go through an exact multiple of rate multiplier cycles or suffer an error. Eliminating such a requirement is a goal of this invention. However, the numerous additions this system uses can eventually create significant errors from small truncation errors. The simple solution to this is to simply initialize every variable at the beginning of every iteration interval or interpolation point and to keep the iteration intervals sufficiently short to avoid errors. The limit in the disclosed configuration is about 8,000 iterations per interval, or the initializaion may cause a motion of two or more microsteps.

TABLE V
CONSTANT ACCELERATION WITH BREAKPOINT TO/FROM CONSTANT VELOCITY WITH LIMIT SEARCH CAPABILITY

| LOC | ARITH. OP. | MEMORY STORE? | CARRY IN? | CARRY SELECT | VARIABLE | JUMP COND. | JUMP DESTINATION |
|---|---|---|---|---|---|---|---|
| $\phi$ | NOP | No | No | $\phi$ | $\phi$ | NOGO | $\phi$ |
| 1 | Load | No | No | 3 | Inc | EQ | 3 |
| 2 | Add | Yes | No | 3 | N | LT | 13 |
| 3 | Load | No | No | 2 | A$\phi$ | Halt | 17 |
| 4 | Add | Yes | No | 1 | V$\phi$ | Never | 5 |
| 5 | Add | Yes | No | $\phi$ | P$\phi$ | Never | 6 |
| 6 | Load | No | No | 2 | A1 | Never | 7 |
| 7 | Add | Yes | Yes | 1 | V1 | Never | 1$\phi$ |
| 1$\phi$ | Add | Yes | Yes | $\phi$ | P1 | S1 | 12 |
| 11 | Load | Yes | Yes | $\phi$ | P2 | Always | $\phi$ |
| 12 | Load-1 | Yes | Yes | $\phi$ | P2 | Always | $\phi$ |
| 13 | Load | No | No | 1 | VC$\phi$ | Halt | 17 |
| 14 | Add | Yes | No | $\phi$ | P$\phi$ | Never | 15 |
| 15 | Load | No | No | 1 | VC1 | Always | 1$\phi$ |
| 16 | NOP | No | No | $\phi$ | $\phi$ | Always | $\phi$ |
| 17 | NOP | No | No | $\phi$ | $\phi$ | Always | $\phi$ |

NOTES:
If variable Inc is zero or if $N_{n+1}$ 0, then the program calculates
$V_{n+1} = V_n + A$
$P_{n+1} = P_n = V_{n+1}$
otherwise the program calculates
$P_{n+1} = P_n + VC$ (Constant Velocity)
where
$N_{n+1} = N_n + Inc$
and
A & V Have 32 bits right justified
P has 48 bits right justified
The index is incremented on instructions 11, 12 and 17.
The velocity is set in instructions 7 and 15.
The position is set in instruction 10.

The initialization of every variable at the beginning of each interval also eliminates another numerical error. The Main Computer calculates the interval end points with a floating point processor while the iteration or Secondary Computer calculates with an adder. These processes are different, and therefore, a difference can occur. If all variables where not initialized on each interval then the Secondary Computer could be commanding one position while the Main Computer thinks it is in another.

The Main Computer programming for this third embodiment is quite similar to the Main Computer programming for the first embodiment. The differences are in the fault handling. The fault handling is in hardware, the Main Computer need only interrogate the Secondary Computers for the motor position and wait for operation instructions.

From the proceeding description of the preferred embodiments, it is evident that the objects of the invention are attained in that a method for producing quadratic and cubic approximations of the position of a servomechanism versus time is shown. Since any function with continuous derivatives may be expressed as a series, it is feasible to generate a wide variety of functions using the present system. The greater power of a Secondary Computer over current art interpolators allows the Main Computer to use more sophisticated integration routines. These routines are more efficient than simpler routines such as Euler's. Consequently, the Main Computer may be less powerful or the Main Computer programming can perform more calculations. The greater calculation capability allows higher level numeric control languages such as APT or ADAPT to be used directly instead of through a remote data processing computer.

The major thrust of the present description has been the use of two computers and a timing source in a numerical control system. The present invention may be used in any control system wherein a machine, including a surface or space vehicle, traverses a desired path or trajectory. The Main Computer divides the path into a plurality of interpolation or variables as sets of interpolation point data for each interpolation point on the path. The Secondary Computer calculates by extrapolation from the set of interpolation point data a plurality of sets of extrapolation point data which are used as a sequence of driver command signals to cause the machine to traverse the path from the interpolation point. The Secondary Computer Controller is a timing source under the control of the Main Computer to determine the number of sets of extrapolation point data to be calculated for each interpolation point and the rate at which the driver command signals are produced in the sequence.

Although the invention has been described and illustrated in detail, it is to be clearly understood that the same is by way of illustration and example only and not to be taken by way of limitation. The Secondary Computer can be in the position and possibly the velocity feedback loops in a standard servo positioning servo system. The type of positioning system that is formed, i.e., the Secondary Computer with either a stepping motor or a servo motor and feedback sensors, is of only slight consequence to the routines in the Main Computer. The spirit and scope of this invention is to be limited only by the terms of the appended claims.

What is claimed:

1. In an animation stand having a camera, a support means for positioning an object relative to said camera, and drive means for moving said camera and support means relative to each other in response to driver command signals, the improvement comprising:
   means for producing input command signals in response to non-numeric manual manipulations and
   computing means for calculating driver command signals in response to said input command signals, storing said calculated driver command signals and outputing driver command signals to said driver means to move said object and camera relative to each other.

2. The animation stand according to claim 1 wherein said input means produces a velocity input command signal and said computing means calculators, stores and outputs position driver command signals.

3. The animation stand according to claim 1 including means for inputting sequence identification data to said computing means for specific driver command signals and said computing means includes a stored program for generating a plurality of driver command signals from said calculated and stored driver command signals in a sequence using said sequence identification data.

4. The animation stand according to claim 1 including a plurality of driver means, said input means include means to signify which driver means is to be commanded and said computing means calculators, stores and outputs driver command signals to the signified driver means.

5. The animation stand according to claim 1 wherein said driver command signals stored are position command signals and said computing means calculates and outputs driver command signals as position and velocity command signals to effectuate smooth motion between said stored position command signals.

6. In an animation stand having a camera, a support means for positioning an object relative to said camera, and driver means for moving said camera and support means relative to each other in response to driver command signals, the improvement comprising:
   means for converting non-numeric manual manipulations into input command signals;
   input means for providing control data;
   computing means for calculating and outputing driver command signals in response to said input command signals to position said object and said camera relative to each other, storing a plurality of position resulting from a plurality of said driver command signals, and calculating and outputting a plurality of driver command signals from said stored positions and said control data to sequentially position said object and camera relative to each other.

7. The animation stand according to claim 6 wherein said converting means converts said manual minipulations into velocity input command signals.

8. The animation stand according to claim 6 including a plurality of driver means, said control data include data signifing which driver means is to be driven by said input command signals.

9. The animation stand according to claim 6 wherein said driver means include stepping motors and said computing means calculators and outputs driver command signals as numerals representing positions of said stepping motors.

10. The animation stand according to claim 6 wherein said computing means calculators and outputs driver command signals as position and velocity driver command signals.

11. A method of generating a sequence of positions of a camera and an object on a support means relative to each other in an animation stand having a calculating means comprising:
   (a) positioning said support means and said camera relative to each other;

(b) operating said calculating means to determine and store the position in a storing means;
(c) storing time frame data in said storing means for said stored position;
(d) repeating steps a, b and c to define stored sequence positions; and
(e) operating said calculating means to derive a time-position curve for said stored sequence.

12. The method according to claim 11 wherein said animation stand includes motors and motor drivers to position said camera and said support means relative to each other, and the method includes calculating driver signals from said stored position and time frame data to produce a sequence of positions.

13. The method according to claim 12 wherein the positioning of step a is produced by said calculating means calculating driver command signals in response to manual inputs.